(12) United States Patent
Podder et al.

(10) Patent No.: US 11,366,845 B2
(45) Date of Patent: Jun. 21, 2022

(54) FACILITATING MERGING OF CONCEPT HIERARCHIES

(71) Applicant: Accenture Global Solutions Limited, Dublin (IE)

(72) Inventors: Sanjay Podder, Thane (IN); Bruno Marra, Antibes (FR); Neville Dubash, Mumbai (IN); Venkatesh Subramanian, Bangalore (IN); Nisha Ramachandra, Bangalore (IN); Padmaraj Bhat, Bengaluru (IN); Karthik Acharyulu, Bangalore (IN); Subramanian Palanisami, Tamil Nadu (IN); Kaushik Turlapaty, Andhra Pradesh (IN)

(73) Assignee: Accenture Global Solutions Limited, Dublin (IE)

( * ) Notice: Subject to any disclaimer, the term of this patent is extended or adjusted under 35 U.S.C. 154(b) by 316 days.

(21) Appl. No.: 16/417,170

(22) Filed: May 20, 2019

(65) Prior Publication Data
US 2020/0372060 A1 Nov. 26, 2020

(51) Int. Cl.
*G06F 16/30* (2019.01)
*G06F 16/41* (2019.01)
(Continued)

(52) U.S. Cl.
CPC .......... *G06F 16/41* (2019.01); *G06F 16/438* (2019.01); *G06F 16/48* (2019.01)

(58) Field of Classification Search
CPC ......... G06F 16/41; G06F 16/438; G06F 16/48
(Continued)

(56) References Cited

U.S. PATENT DOCUMENTS

| 10,223,438 B1 | 3/2019 | Xu et al. |
| 2008/0104098 A1* | 5/2008 | Li .................. G07F 7/1008 707/999.102 |

(Continued)

FOREIGN PATENT DOCUMENTS

| JP | 2005078627 A | 3/2005 |
| JP | 2005251157 A | 9/2005 |

(Continued)

OTHER PUBLICATIONS

Bhagat et al. "Implementation of Data Merging Technique for Multi-Document Summarizer", International Journal of Scientific Research in Computer Science, Engineering and Information Technology, vol. 3 | Issue 4 | ISSN : 2456-3307, 2018, 7 pages.

(Continued)

*Primary Examiner* — Sana A Al-Hashemi
(74) *Attorney, Agent, or Firm* — Harrity & Harrity, LLP

(57) ABSTRACT

A device may identify a first concept hierarchy of a first multimedia presentation and a second concept hierarchy of a second multimedia presentation. The device may determine a set of concepts associated with the first concept hierarchy and the second concept hierarchy and may determine a plurality of similarity scores associated with the set of concepts. The device may generate a new concept hierarchy based on the plurality of similarity scores, the first concept hierarchy, and the second concept hierarchy by: performing a first process to merge a concept with an additional concept; performing a second process to position a concept sequentially before or after an additional concept; performing a third process to position a concept and a different concept to sequentially follow an additional concept; and performing a fourth process to position a concept to sequentially follow an additional concept and a different concept.

20 Claims, 15 Drawing Sheets

(51) Int. Cl.
*G06F 16/438* (2019.01)
*G06F 16/48* (2019.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 2012/0023250 A1* | 1/2012 | Chen | H04N 21/234327 709/231 |
| 2012/0226716 A1* | 9/2012 | Yeh | G06F 16/367 707/E17.012 |
| 2015/0154148 A1* | 6/2015 | Lightner | G06F 40/00 704/9 |
| 2018/0081904 A1* | 3/2018 | Cosby | G06F 16/248 |
| 2018/0295396 A1* | 10/2018 | Ramadorai | H04N 21/2743 |
| 2018/0307964 A1* | 10/2018 | Benja-Athon | G06N 5/003 |

FOREIGN PATENT DOCUMENTS

| | | |
|---|---|---|
| JP | 2013003893 A | 1/2013 |
| JP | 2014228969 A | 12/2014 |

OTHER PUBLICATIONS

Sukumar et al., "Semantic based Sentence Ordering Approach for Multi-Document Summarization", International Journal of Recent Technology and Engineering (IJRTE), ISSN: 2277-3878, vol. 3, Issue-2, May 2014, 6 pages.

Bagalokotkar et al., "A Novel Technique for Efficient Text Document Summarization as a Service", 2013, 5 pages.

Ignatov, "Introduction to Formal Concept Analysis and Its Applications in Information Retrieval and Related Fields", Mar. 8, 2017, 102 pages.

Belohlavek, "Introduction To Formal Concept Analysis", 2018, 47 pages.

* cited by examiner

122 Determine a set of concepts that includes one or more first concepts associated with the first concept hierarchy and one or more second concepts associated with the second concept hierarchy

124 Determine a plurality of similarity scores associated with the set of concepts

| | C1 | C2 | C3 | C4 | C5 | C6 | C7 |
|---|---|---|---|---|---|---|---|
| C1 | 1.00 | 0.45 | 0.76 | 0.33 | 0.89 | 0.65 | 0.71 |
| C2 | 0.45 | 1.00 | 0.12 | 0.37 | 0.49 | 0.67 | 0.35 |
| ... | ... | ... | ... | ... | ... | ... | ... |

Example Similarity Scores

FACILITATING MERGING OF CONCEPT HIERARCHIES

BACKGROUND

A multimedia presentation may include different media items, such as text media items, audio media items, video media items, mixed media items, and/or the like. A media item may be associated with one or more topics and/or concepts.

SUMMARY

According to some implementations, a method may include selecting, by a device, a first multimedia data and a second multimedia data of a plurality of multimedia data; identifying, by the device, a first concept hierarchy of the first multimedia data and a second concept hierarchy of the second multimedia data; determining, by the device, a set of concepts that includes one or more first concepts associated with the first concept hierarchy and one or more second concepts associated with the second concept hierarchy; determining, by the device, a plurality of similarity scores associated with the set of concepts, wherein a similarity score, of the plurality of similarity scores, indicates a semantic similarity between two concepts of the set of concepts; and generating, by the device, a new concept hierarchy based on the plurality of similarity scores, the first concept hierarchy, and the second concept hierarchy, wherein generating the new concept hierarchy includes at least one of: performing a first process to merge a concept with an additional concept; performing a second process to position a concept sequentially before or after an additional concept; performing a third process to position a concept and an additional concept to sequentially follow a different concept; or performing a fourth process to position a concept to sequentially follow an additional concept and a different concept.

According to some implementations, a device may include one or more memories; and one or more processors, communicatively coupled to the one or more memories, configured to: identify a plurality of multimedia presentations, wherein each multimedia presentation includes a concept hierarchy identifying one or more concepts covered by the multimedia presentation; determine a respective richness of content score for each multimedia presentation of the plurality of multimedia presentations; select, based on determining the respective richness of content score for each multimedia presentation of the plurality of multimedia presentations, a first multimedia presentation and a second multimedia presentation of the plurality of multimedia presentations; identify a first concept hierarchy of the first multimedia presentation and a second concept hierarchy of the second multimedia presentation; determine a set of concepts that includes one or more first concepts associated with the first concept hierarchy and one or more second concepts associated with the second concept hierarchy; determine a plurality of similarity scores associated with the set of concepts, wherein a similarity score, of the plurality of similarity scores, indicates a semantic similarity between two concepts of the set of concepts; and generate a new concept hierarchy based on the plurality of similarity scores, the first concept hierarchy, and the second concept hierarchy, wherein the one or more processors, when generating the new concept hierarchy, are configured to: perform a first process to merge a concept with an additional concept, perform a second process to position a concept sequentially before or after an additional concept, perform a third process to position a concept and at least one additional concept to sequentially follow a different concept, and perform a fourth process to position a concept to sequentially follow an additional concept and at least one different concept.

According to some implementations, a non-transitory computer-readable medium may store one or more instructions. The one or more instructions, when executed by one or more processors of a device, may cause the one or more processors to: identify a plurality of media items; determine respective keywords associated with each media item of the plurality of media items; identify a plurality of multimedia presentations, wherein each multimedia presentation, of the plurality of multimedia presentations, includes at least one media item of the plurality of media items; determine a respective richness of content score for each multimedia presentation, of the plurality of multimedia presentations, based on keywords associated with the at least one media item included in the multimedia presentation; select, based on the respective richness of content score for each multimedia presentation of the plurality of multimedia presentations, a first multimedia presentation and a second multimedia presentation of the plurality of multimedia presentations; identify a first concept hierarchy of the first multimedia presentation and a second concept hierarchy of the second multimedia presentations; determine a set of concepts that includes one or more first concepts associated with the first concept hierarchy and one or more second concepts associated with the second concept hierarchy; determine a plurality of similarity scores associated with the set of concepts; and generate a new concept hierarchy based on the plurality of similarity scores, the first concept hierarchy, and the second concept hierarchy, wherein the one or more instructions, that cause the one or more processors to generate the new concept hierarchy, cause the one or more processors to: perform a first process to merge a concept with an additional concept; perform a second process to position a concept sequentially before or after an additional concept; perform a third process to position a concept and a different concept to sequentially follow an additional concept; and perform a fourth process to position a concept to sequentially follow at least two additional concepts.

DETAILED DESCRIPTION

Figure 1A:
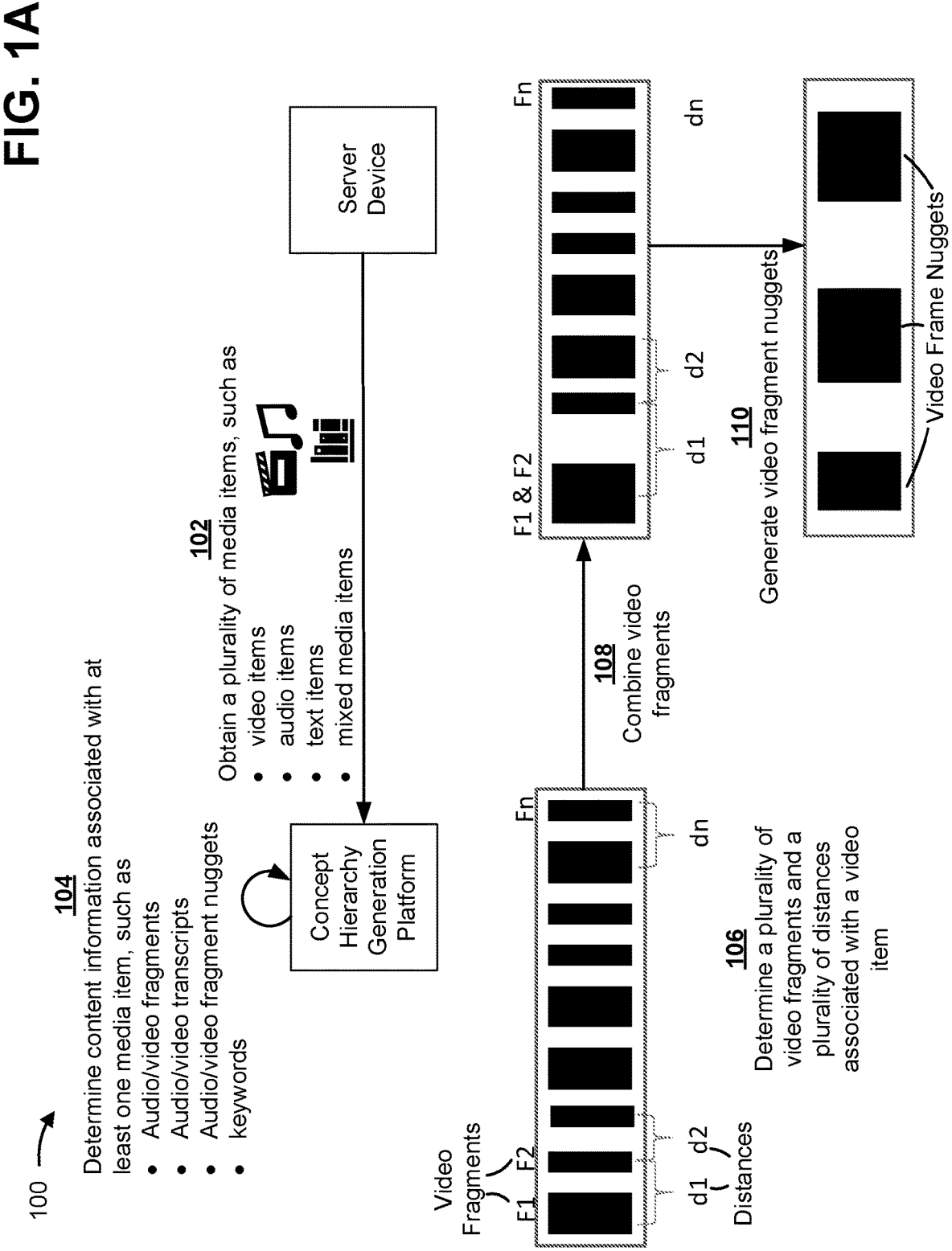
FIGS. 1A-1I are diagrams of one or more example implementations described herein.

The following detailed description of example implementations refers to the accompanying drawings. The same reference numbers in different drawings may identify the same or similar elements.

A device may have a repository of disparate multimedia items that are associated with a diverse array of topics. In some cases, the device organizes the multimedia items into a plurality of multimedia presentations, where a multimedia presentation includes one or more multimedia items and is associated with a concept hierarchy (e.g., a table of contents)

that identifies one or more concepts associated with the one or more multimedia items. A concept may be an idea or a topic that may be expressed in one or more words and/or one or more sentences. In some cases, a person interacts with the device to identify and review one or more multimedia presentations that are relevant to a particular topic. However, in many cases, the device can only present the entirety of the one or more multiple multimedia presentations to the person, not just multimedia items of the one or more multimedia presentations that have concepts that are relevant to the particular topic. This may unnecessarily consume resources (e.g., processing resources, memory resources, power resources, communication resources, and/or the like) of the device to present multimedia items of the one or more multimedia presentations that are not relevant to the particular topic.

According to some implementations described herein, a concept hierarchy generation platform may identify a plurality of media items and determine respective content information associated with each media item. In some implementations, the concept hierarchy generation platform may identify a plurality of multimedia presentations that each respectively includes at least one media item and determine a respective richness of content score for each multimedia presentation based on content information associated with the at least one media item included in the multimedia presentation. In some implementations, the concept hierarchy generation platform may select, based on the respective richness of content score for each multimedia presentation of the plurality of multimedia presentations, a first multimedia presentation and a second multimedia presentation of the plurality of multimedia presentations. In some implementations, the concept hierarchy generation platform may identify a first concept hierarchy of a first multimedia presentation and a second concept hierarchy of a second multimedia presentation. In some implementations, the concept hierarchy generation platform may determine a set of concepts associated with the first concept hierarchy and the second concept hierarchy and may determine a plurality of similarity scores associated with the set of concepts. In some implementations, the concept hierarchy generation platform may generate a new concept hierarchy based on the plurality of similarity scores, the first concept hierarchy, and the second concept hierarchy by: performing a first process to merge a concept with an additional concept; performing a second process to position a concept sequentially before or after an additional concept; performing a third process to position a concept and a different concept to sequentially follow an additional concept; and performing a fourth process to position a concept to sequentially follow an additional concept and a different concept.

In this way, the concept hierarchy generation platform reduces a demand for resources (e.g., processing resources, memory resources, power resources, communication resources, and/or the like) to present concepts associated with multimedia items of multimedia presentations that are relevant to a particular topic. For example, the concept hierarchy generation platform may generate a new concept hierarchy that only lists concepts and/or multimedia items that are relevant to the particular topic, and not any other concepts or multimedia items. A user may interact with the new concept hierarchy to consume the concepts and/or multimedia items that are relevant to the particular topic without the concept hierarchy generation platform using resources to present superfluous content associated with a multimedia presentation.

FIGS. 1A-1I are diagrams of one or more example implementations 100 described herein. As shown in FIGS. 1A-1I, example implementation(s) 100 may include a server device and/or a concept hierarchy generation platform. The server device and the concept hierarchy generation platform may each be a computing device, a server device, a cloud computing device, and/or the like. In some implementations, the server device and/or the concept hierarchy generation platform may be connected via a network, such as the internet, an intranet, and/or the like. Some example implementations described herein concern a single server device and/or a single concept hierarchy generation platform, but implementations may include a plurality of server devices and/or a plurality of concept hierarchy generation platforms. For example, a single concept hierarchy generation platform may be associated with a plurality of server devices and/or a single server device may be associated with a plurality of concept hierarchy generation platforms.

As shown in FIG. 1A and by reference number 102, the concept hierarchy generation platform may obtain a plurality of media items (also referred to as a plurality of media data) from the server device. For example, the server device may send the plurality of media items to the concept hierarchy generation platform and/or the concept hierarchy generation platform may query the server device for the plurality of media items and receive the plurality of media items from the server device. The concept hierarchy generation platform may store the plurality of media items in a data structure (e.g., a media item repository). A media item may be a video item (e.g., a video file) (also referred to as a video data), an audio item (e.g., a music file) (also referred to as an audio data), a text item (e.g., a text document) (also referred to as a text data), a mixed media item (e.g., a slide show file, a blog with text, video, and/or audio, and/or the like) (also referred to as a mixed media data), and/or the like.

The concept hierarchy generation platform may identify one or more media items, of the plurality of media items, for processing. For example, as shown by reference number 104, the concept hierarchy generation platform may process the one or more media items to determine respective content information associated with the one or more media items. Content information may include audio fragments, audio transcripts, audio fragment nuggets, video fragments, video transcripts, video fragment nuggets, keywords, and/or the like.

For example, for a video item (also referred to as a video data), as shown by reference number 106, the concept hierarchy generation platform may determine a plurality of video fragments (shown as video fragments F1 through Fn in FIG. 1A) and/or a plurality of distances (shown as distances d1 through dn in FIG. 1A) associated with the video item. The plurality of video fragments may also be referred to as a plurality of topic fragments and the plurality of distances may also be referred to as a plurality of time parameters. A video fragment may comprise one or more video frames, where one video frame may comprise video data information for a specific moment in time (e.g., a portion of a second). In some implementations, the video fragment may be associated with a video fragment transcript that identifies one or more words audibly presented in the video fragment. A distance (also referred to as a time parameter) may indicate an amount of time between corresponding points of one video fragment and another video fragment. For example, a distance may be the amount of time between a starting time of a first video fragment and a starting time of a second video fragment. As another example, a distance may be the amount of time between a midpoint time of a first video fragment and a midpoint time of a second video fragment.

As shown by reference numbers 108 and 110, the concept hierarchy generation platform may combine one or more video fragments together to generate a video frame nugget (also referred to as an amalgamated video section). For example, the concept hierarchy generation platform may combine video fragments F1 and F2 to form a video frame nugget. In some implementations, the concept hierarchy generation platform may determine a distance (also referred to as a time parameter) between two adjacent video fragments and may combine, based on the distance, the two adjacent video fragments together to form a video frame nugget. For example, the concept hierarchy generation platform may join a first video frame and a second video frame (e.g., when the first video frame is adjacent to the second video frame) to form a video frame nugget when the distance between the first video frame and the second video frame satisfies a threshold distance (e.g., the distance is less than the threshold distance). The concept hierarchy generation platform may iteratively add one or more adjacent video fragments to the video frame nugget in this way until a distance associated with the video frame nugget and an adjacent video fragment satisfies the threshold distance. In some implementations, the concept hierarchy generation platform may add video fragment transcripts, that are associated with the video fragments that comprise the video fragment nugget, to the video fragment nugget.

In some implementations, the concept hierarchy generation platform may determine the threshold distance based on one or more distances associated with the video frames that comprise the video item. For example, the threshold distance may be an average (e.g., a mean) of the one or more distances. This ensures that the concept hierarchy generation platform generates video fragment nuggets of sufficient size to be comprehensible to a user.

In some implementations, the concept hierarchy generation platform may determine, for an audio item (also referred to as an audio data), a plurality of audio fragments (also referred to as a plurality of topic fragments) and/or a plurality of distances (also referred to as plurality of time parameters) associated with the audio item in a similar manner for a video item as described herein in relation to reference number 106. For example, an audio fragment may comprise one or more audio frames, where one audio frame may comprise audio data information for a specific moment in time (e.g., a portion of a second), and/or the audio fragment may be associated with an audio fragment transcript that identifies one or more words audibly presented in the audio fragment. A distance (also referred to as a time parameter) may indicate an amount of time between corresponding points of one audio fragment and another audio fragment.

In some implementations, the concept hierarchy generation platform may combine one or more audio fragments together to generate an audio frame nugget (also referred to as an amalgamated audio section) in a similar manner as described herein in relation to combining video fragments to generate a video frame nugget with reference to reference numbers 108 and 110. For example, the concept hierarchy generation platform may determine a distance (also referred to as a time parameter) between two adjacent audio fragments and may combine, based on the distance, the two adjacent audio fragments together to form an audio frame nugget. In some implementations, the concept hierarchy generation platform may join a first audio frame and a second audio frame (e.g., when the first audio frame is adjacent to the second audio frame) to form an audio frame nugget when the distance between the first audio frame and the second audio frame satisfies a threshold distance (e.g., the distance is less than the threshold distance). The concept hierarchy generation platform may iteratively add one or more adjacent audio fragments to the audio frame nugget in this way until a distance associated with the audio frame nugget and an adjacent audio fragment satisfies the threshold distance. In some implementations, the concept hierarchy generation platform may add audio fragment transcripts, that are associated with the audio fragments that comprise the audio fragment nugget, to the audio fragment nugget.

In some implementations, the concept hierarchy generation platform may determine the threshold distance based on one or more distances associated with the audio frames that comprise an audio item. For example, the threshold distance may be an average (e.g., a mean) of the one or more distances. This ensures that the concept hierarchy generation platform generates audio fragment nuggets of sufficient size to be comprehensible to a user.

In some implementations, the concept hierarchy generation platform may determine one or more keywords associated with a video item based on at least one video fragment, video fragment transcript, and/or video fragment nugget associated with the video item. For example, the concept hierarchy generation platform may, for at least one video frame nugget of a video item, process (e.g., using a natural language processing technique) one or more video frame transcripts included in the at least one video frame nugget to determine one or more keywords associated with the at least one video frame nugget. Accordingly, the concept hierarchy generation platform may determine the one or more keywords associated with the video item based on the one or more keywords associated with the at least one video frame nugget. Additionally, or alternatively, the concept hierarchy generation platform may determine one or more keywords associated with an audio item based on at least one audio fragment, video audio transcript, and/or audio fragment nugget associated with the audio item. For example, the concept hierarchy generation platform may, for at least one audio frame nugget of an audio item, process one or more audio frame transcripts included in the at least one audio frame nugget to determine one or more keywords associated with the at least one audio frame nugget and/or may determine the one or more keywords associated with the audio item based on the one or more keywords associated with the at least one audio frame nugget. Additionally, or alternatively, the concept hierarchy generation platform may determine one or more keywords associated with a text item by processing text associated with the text item.

Figure 1B:
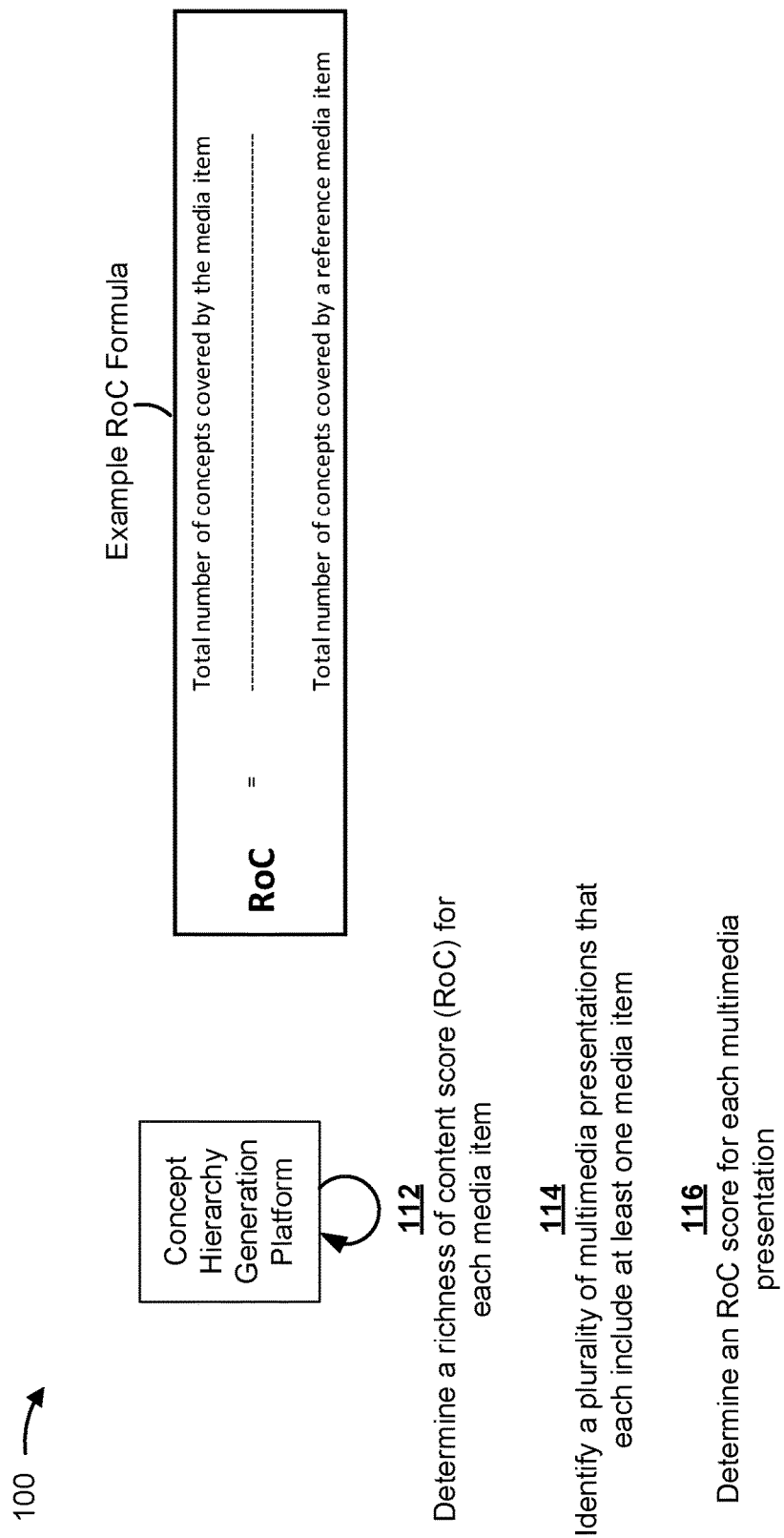

As shown in FIG. 1B and by reference number 112, the concept hierarchy generation platform may determine a richness of content score (sometimes referred to as an "RoC" score) for each media item. A richness of content score for a media item may indicate a breadth of coverage of the media item as compared to a reference media item (e.g., a technical document). For example, as shown by the example RoC formula shown in FIG. 1B, the richness of content score may be a ratio of concepts covered by the reference media item that are also covered by the media item. In some implementations, the concept hierarchy generation platform may determine one or more concepts covered by the reference media item based on one or more keywords associated with the reference media item and/or one or more concepts covered by the media item based on one or more keywords associated with the media item. The concept hierarchy generation platform may compare the one or more concepts covered by the reference media item and the one or more concepts covered by the media item to determine the ratio of concepts.

As shown by reference number 114, the concept hierarchy generation platform may identify a plurality of multimedia presentations (also referred to as a plurality of multimedia data). A multimedia presentation (also referred to as a multimedia data) may include at least one media item. For example, a multimedia presentation may include a video item and an audio item. As another example, a multimedia presentation may include a text item and a multimedia item. Additionally, or alternatively, a multimedia presentation may include a concept hierarchy that identifies one or more concepts covered by the multimedia presentation (e.g., one or more concepts covered by the at least one media item included in the multimedia presentation). In some implementations, the concept hierarchy generation platform may identify and/or determine the at least one media item included in the multimedia presentation and/or the concept hierarchy associated with the multimedia presentation.

As shown by reference number 116, the concept hierarchy generation platform may determine a richness of content score for each multimedia presentation. In some implementations, the richness of content score for a multimedia presentation is an average (e.g., mean) of respective richness of content scores of one or more media items that are included in the multimedia presentation. Additionally, or alternatively, the concept hierarchy generation platform may identify a reference media item and may determine for each media item, of the one or more media items that are included in the multimedia presentation, a respective ratio of concepts covered by the reference media item that are also covered by the media item. The concept hierarchy generation platform may determine the richness of content score of the multimedia presentation based on the respective ratios of the one or more media items. For example, the concept hierarchy generation platform may cause the richness of content score of the multimedia presentation to be the highest ratio of the respective ratios of the one or more media items.

Figure 1C:
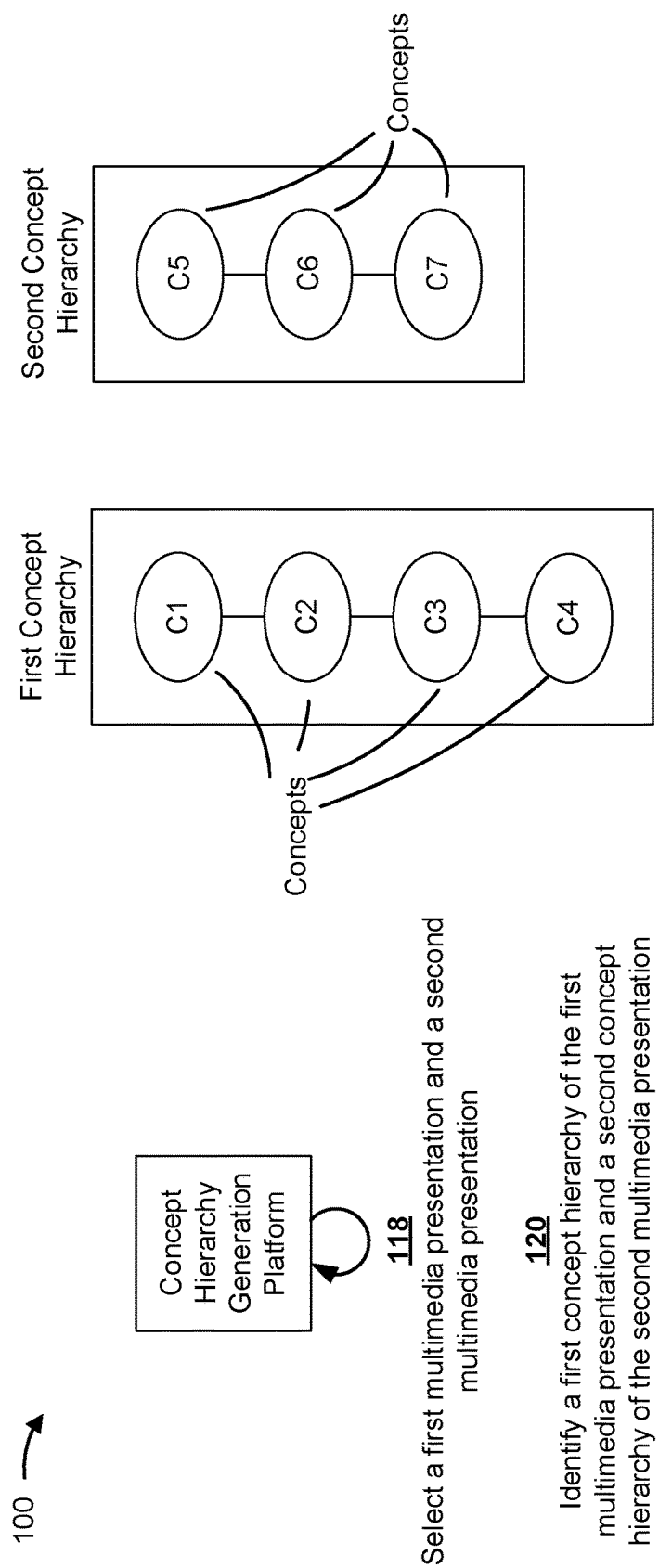

As shown in FIG. 1C and by reference number 118, the concept hierarchy generation platform may select a first multimedia presentation (also referred to as a first multimedia data) and a second multimedia presentation (also referred to as a second multimedia data) of the plurality of multimedia presentations (also referred to as the plurality of multimedia data). Additionally, or alternatively, the concept hierarchy generation platform may receive the first multimedia presentation and/or the second multimedia presentation from another device, such as the server device. The concept hierarchy generation platform may select the first multimedia presentation and the second multimedia presentation based on the respective richness of content scores of the plurality of multimedia presentations. For example, the concept hierarchy generation platform may select the two multimedia presentations with the highest richness of content scores.

As shown by reference number 120, the concept hierarchy generation platform may identify a first concept hierarchy of the first multimedia presentation and/or a second concept hierarchy of the second multimedia presentation. A concept hierarchy may include one or more concepts listed in a sequential order. For example, a concept hierarchy may be and/or may include a table of contents that comprises one or more concepts listed in sequential order. For example, as shown in FIG. 1C, the first concept hierarchy includes four concepts (shown as concepts C1-C4) listed in sequential order with C1 as the first concept in the list. As another example, as shown in FIG. 1C, the second concept hierarchy includes three concepts (shown as concepts C5-C7) listed in sequential order with C5 as the first concept in the list. The concept hierarchy generation platform may identify one or more first concepts in the first concept hierarchy (e.g., the concept hierarchy generation platform may identify the one or more first concepts in a first table of contents included in the first concept hierarchy) and/or may identify one or more second concepts in the second concept hierarchy (e.g., the concept hierarchy generation platform may identify the one or more second concepts in a second table of contents included in the second concept hierarchy)

Figure 1D:

As shown in FIG. 1D and by reference number 122, the concept hierarchy generation platform may determine a set of concepts based on the first concept hierarchy and the second concept hierarchy. The set of concepts may include one or more first concepts associated with the first concept hierarchy and one or more second concepts associated with the second concept hierarchy. For example, as shown in FIG. 1D, a set of concepts includes concepts C1-C7, where C1-C4 comprise one or more first concepts (e.g., one or more concepts associated with the first concept hierarchy) and C5-C7 comprise one or more second concepts (e.g., one or more concepts associated with the second concept hierarchy).

As shown by reference number 124, the concept hierarchy generation platform may determine a plurality of similarity scores associated with the set of concepts. A similarity score may indicate a semantic similarity between two concepts in the set of concepts. In some implementations, the concept hierarchy generation platform may determine a set of concept pairs that includes some or all possible pairs of concepts from the set of concepts. The concept hierarchy generation platform may process each concept pair, in the set of concept pairs, to determine a similarity score for the concept pair. The concept hierarchy generation platform may process a concept pair using a statistical technique, such as a latent Dirichlet allocation (LDA) technique, to determine the similarity score for the concept pair. For example, FIG. 1D shows respective similarity scores associated with concepts C1 and C2 (listed in rows) and concepts C1-C7 (listed in columns) of the set of concepts. In this example, a similarity score ranges from 0.00 to 1.00, where 1.00 indicates an exact similarity between concepts (e.g., as shown for the C1,C1 entry and the C2,C2 entry) and 0.00 indicates no similarity between concepts. A similarity score greater than or equal to 0.50 (e.g., a 0.76 similarity score for entry C1,C3, a 0.67 score for entry C2, C7, and/or the like) indicates that the concepts are more similar than dissimilar and a similarity score less than 0.50 (e.g., a 0.33 similarity score for entry C1, C5, a 0.12 similarity score for entry C2, C3, and/or the like) indicates that the concepts are more dissimilar than similar.

Figure 1E:
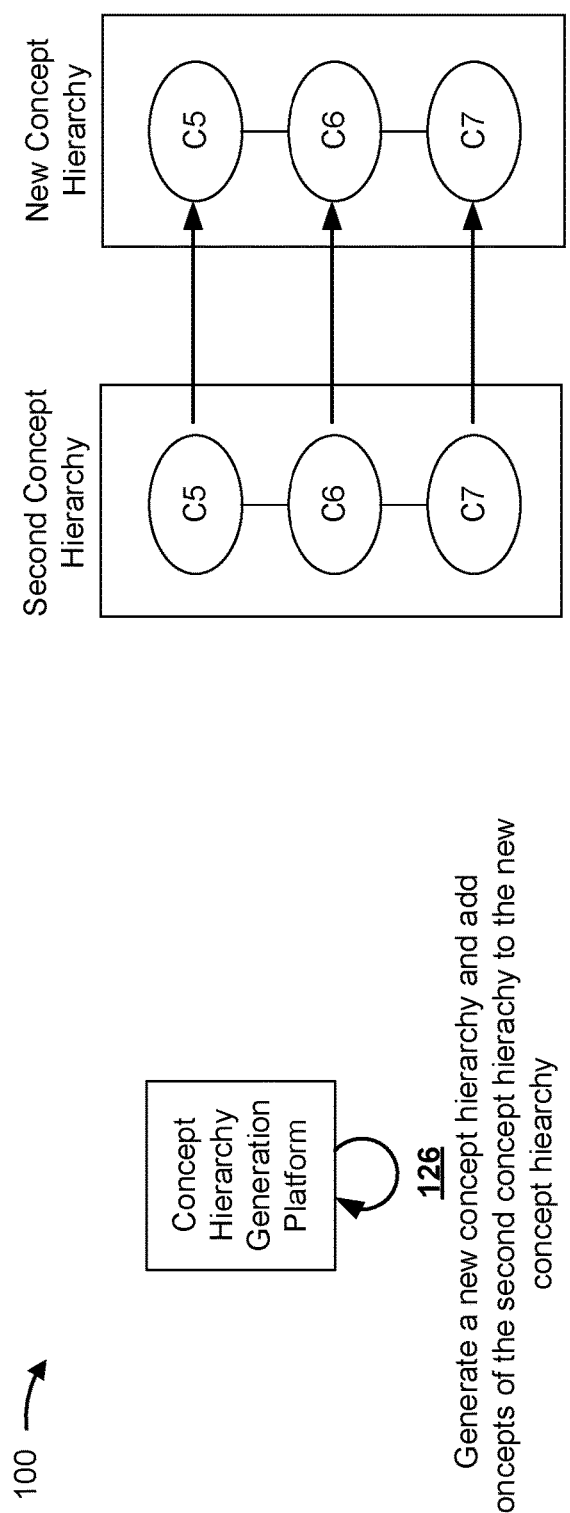

As shown in FIG. 1E and by reference number 126, the concept hierarchy generation platform may generate a new concept hierarchy and/or add concepts to the new concept hierarchy based on the plurality of similarity scores, the first concept hierarchy, and/or the second concept hierarchy. For example, to build the new concept hierarchy, the concept hierarchy generation platform may add one or more concepts of the second concept hierarchy to the new concept hierarchy. In some implementations, the concept hierarchy generation concept hierarchy generation platform may add all the concepts of the second concept hierarchy and may maintain the sequential order of the concepts in the new concept hierarchy. For example, as shown in FIG. 1E, the concept hierarchy generation platform may maintain the sequential order of the one or more concepts of the second concept hierarchy in the new concept hierarchy.

Figure 1F:
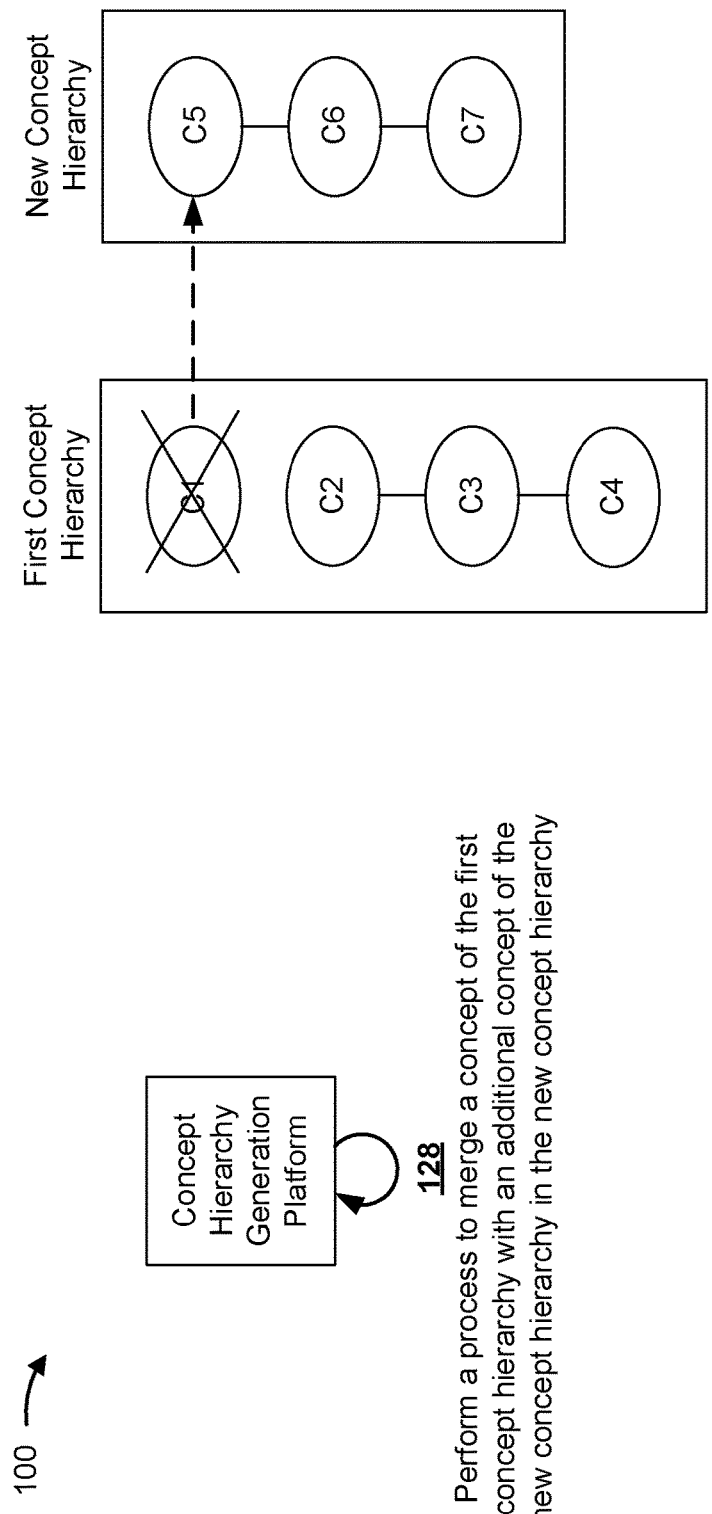

As shown in FIG. 1F and by reference number 128, to further build the new concept hierarchy, the concept hierarchy generation platform may perform a process to merge a concept (e.g., of the first concept hierarchy) with an additional concept (e.g., of the new concept hierarchy) in the new concept hierarchy. In some implementations, the concept hierarchy generation platform may perform the process to merge the concept with the additional concept when the concept and the additional concept are sufficiently similar that maintaining the concept and the additional concept as separate concepts is not warranted. For example, the concept hierarchy generation platform may perform the process to merge the concept with the additional concept when a similarity score associated with the concept and the additional concept satisfies a threshold (e.g., the similarity score is greater than or equal to the threshold).

When merging the concept with the additional concept, the concept hierarchy generation platform may determine one or more first keywords associated with the concept and one or more second keywords associated with the additional concept. The concept hierarchy generation platform may determine that at least one first keyword of the one or more keywords is not associated with the additional concept. The concept hierarchy generation platform may add (e.g., based on determining that the at least one first keyword is not associated with the additional concept) some or all of the one or more first keywords to the one or more second keywords and/or remove the concept from the set of concepts (e.g., without adding the concept to the new concept hierarchy). In this way, the additional concept may be associated with the one or more first keywords as well as the one or more second keywords, but the concept hierarchy generation platform does not need to use resources (e.g., processing resources, memory resources, power resources, and/or the like) to maintain the concept.

For example, as shown in FIG. 1F, the concept hierarchy generation platform merges concept C1 of the first concept hierarchy with concept C5 of the new concept hierarchy. The concept hierarchy generation platform adds keywords associated with concept C1 to keywords associated with C5 and removes concept C1 from the set of concepts.

Figure 1G:
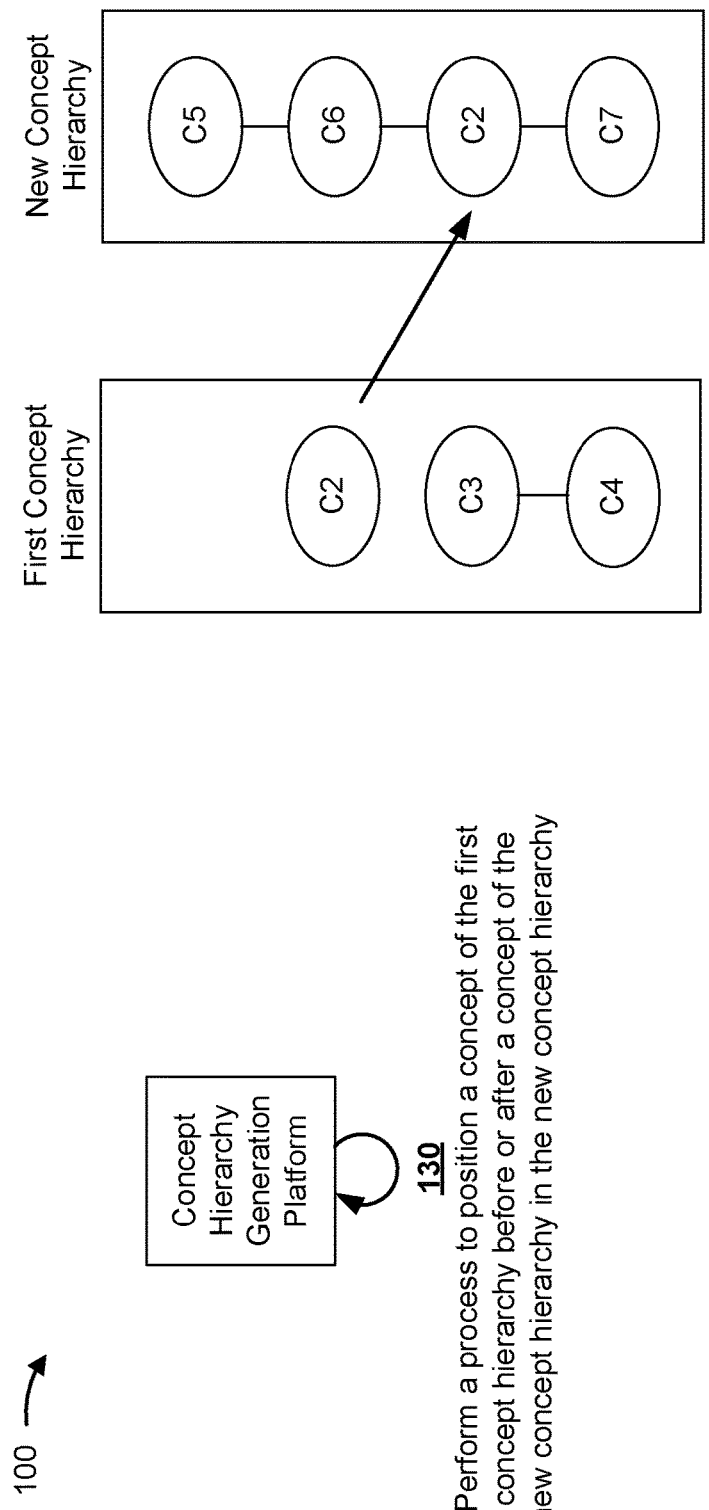

As shown in FIG. 1G and by reference number 130, to further build the new concept hierarchy, the concept hierarchy generation platform may perform a process to position a concept (e.g., of the first concept hierarchy) sequentially before or after an additional concept (e.g., of the new concept hierarchy) in the new concept hierarchy. In some implementations, the concept hierarchy generation platform may perform the process to position the concept sequentially before or after the additional concept when the concept and the additional concept are not sufficiently similar to dissolve the concept into the additional concept. For example, the concept hierarchy generation platform may perform the process to position the concept sequentially before or after the additional concept when a similarity score associated with the concept and the additional concept does not satisfy a threshold (e.g., the similarity score is less than the threshold).

In some implementations, the concept hierarchy generation platform may respectively split the concept and the additional concept into "halves" to determine whether the concept should be positioned sequentially before or after the additional concept. For example, the concept hierarchy generation platform may determine a first similarity score associated with an "upper half" of the concept and a "lower half" of the additional concept and a second similarity score associated with a "lower half" of the concept and an "upper half" of the additional concept. The concept hierarchy generation platform may position the concept sequentially after the additional concept when the first similarity score is greater than or equal to the second similarity score (e.g., because the "lower half" of the additional concept is more similar to the "upper half" of the concept than the "lower half" of the concept is to the "upper half" of the additional concept, which implies that a transition from the additional concept to the concept is more comprehensible to a user than a transition from the concept to the additional concept). Additionally, or alternatively, the concept hierarchy generation platform may position the concept sequentially before the additional concept when the first similarity score is less than the second similarity score.

In another example, the concept hierarchy generation platform may determine a first set of elements and a second set of elements of the concept (e.g., a first set of "upper half" sentences and a second set of "lower half" sentences associated with the first concept) and/or a first set of elements and a second set of elements of the additional concept (e.g., a first set of "upper half" sentences and a second set of "lower half" sentences associated with the first concept). The concept hierarchy generation platform may determine a first element similarity score based on the first set of elements of the concept and the second set of elements of the additional concept and/or a second element similarity score based on the second set of elements of the concept and the first set of elements of the additional concept. Accordingly, the concept hierarchy generation platform may position the concept to sequentially follow the additional concept when the first element similarity score is greater than or equal to the second element similarity score and/or position the additional concept to sequentially follow the concept when the first element similarity score is less than the second element similarity score.

In an additional example, as shown in FIG. 1G, the concept hierarchy generation platform positions concept C2 of the first concept hierarchy sequentially after concept C6 of the new concept hierarchy. In this case, concept hierarchy generation platform determined that concept C2 (e.g., the next concept available in the first concept hierarchy) had a similarity score with concept C6 that was higher (e.g., shown as 0.67 in FIG. 1D) than with any other concept in the new concept hierarchy, so the concept hierarchy decided to determine whether C2 should be positioned before or after concept C6. The concept hierarchy generation platform determined to position concept C2 after concept C6 because a first element similarity score is greater than or equal to a second element similarity score associated with concept C2 and concept C6.

Figure 1H:
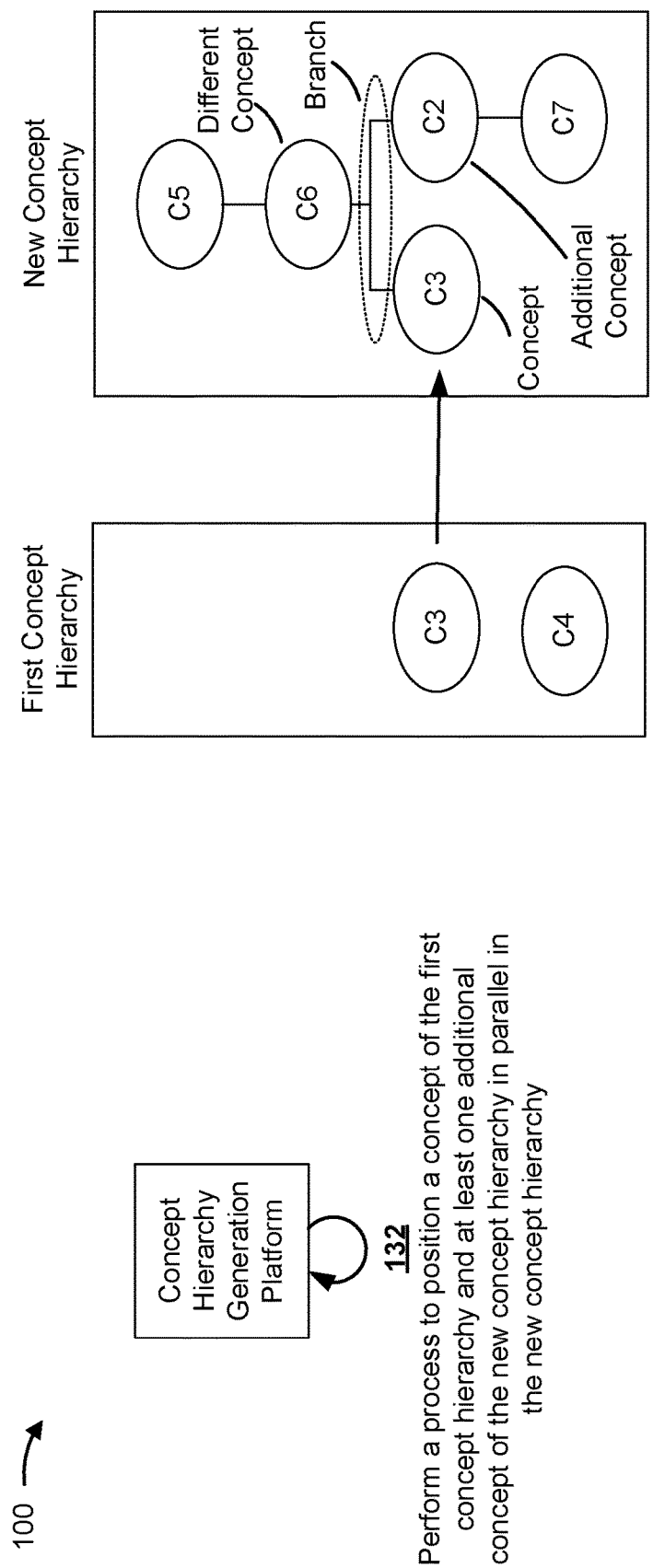

As shown in FIG. 1H and by reference number 132, the concept hierarchy generation platform may perform a process to position a concept (e.g., of the first concept hierarchy) and at least one additional concept (e.g., of the new concept hierarchy) in parallel in the new concept hierarchy. That is, the concept hierarchy generation platform may position the concept and the at least one additional concept to sequentially follow a different concept (of the new concept hierarchy). This is sometimes referred to as a "branch," because two or more concepts sequentially follow one concept such that the two or more concepts are in parallel with each other. In some implementations, the concept hierarchy generation platform may perform the process to position the concept and the at least one additional concept to sequentially follow the different concept when the concept and the different concept are not sufficiently similar to dissolve the concept into the different concept. For example, the concept hierarchy generation platform may perform the process to position the concept and the at least one additional concept to sequentially follow the different concept when a similarity score associated with the concept and the different concept does not satisfy a threshold (e.g., the similarity score is less than the threshold).

In some implementations, the concept hierarchy generation platform may determine one or more additional similarity scores associated with the different concept (e.g., of the new concept hierarchy) and one or more other concepts of the new concept hierarchy. The concept hierarchy generation platform may determine that the similarity score associated with the concept and the different concept matches, within a tolerance (e.g., within a percentage tolerance, such as within a 3% tolerance), at least one similarity score of the one or more additional similarity scores (e.g., the similarity score associated with the concept from the first concept hierarchy and the different concept from the new concept hierarchy matches at least one similarity score associated with the different concept and at least one other concept of the new concept hierarchy). Accordingly, the concept hierarchy generation platform may position the concept and the at least one additional concept to sequentially follow the different concept (e.g., cause the concept and the at least one additional concept to branch from the different concept).

For example, as shown in FIG. 1H, the concept hierarchy generation platform positions concept C3 of the first concept hierarchy (e.g., the "concept" described above) and concept C2 of the new concept hierarchy (e.g., the "at least one additional concept" described above) to sequentially follow concept C6 of the new concept hierarchy (e.g., the "different concept" as described above). In this case, the concept hierarchy generation platform determined that concept C3 (e.g., the next concept available in the first concept hierarchy) had a similarity score with concept C6 that was higher than with any other concept in the new concept hierarchy, so the concept hierarchy decided to determine whether concept C3 should branch from concept C6 with another concept in the new concept hierarchy. Further, in this example, a similarity score associated with concepts C3 and C6 matches, within a tolerance, a similarity score of C2 and C6, which enables the concept hierarchy generation platform to determine to branch concepts C3 and C2 from concept C6.

Figure 1I:
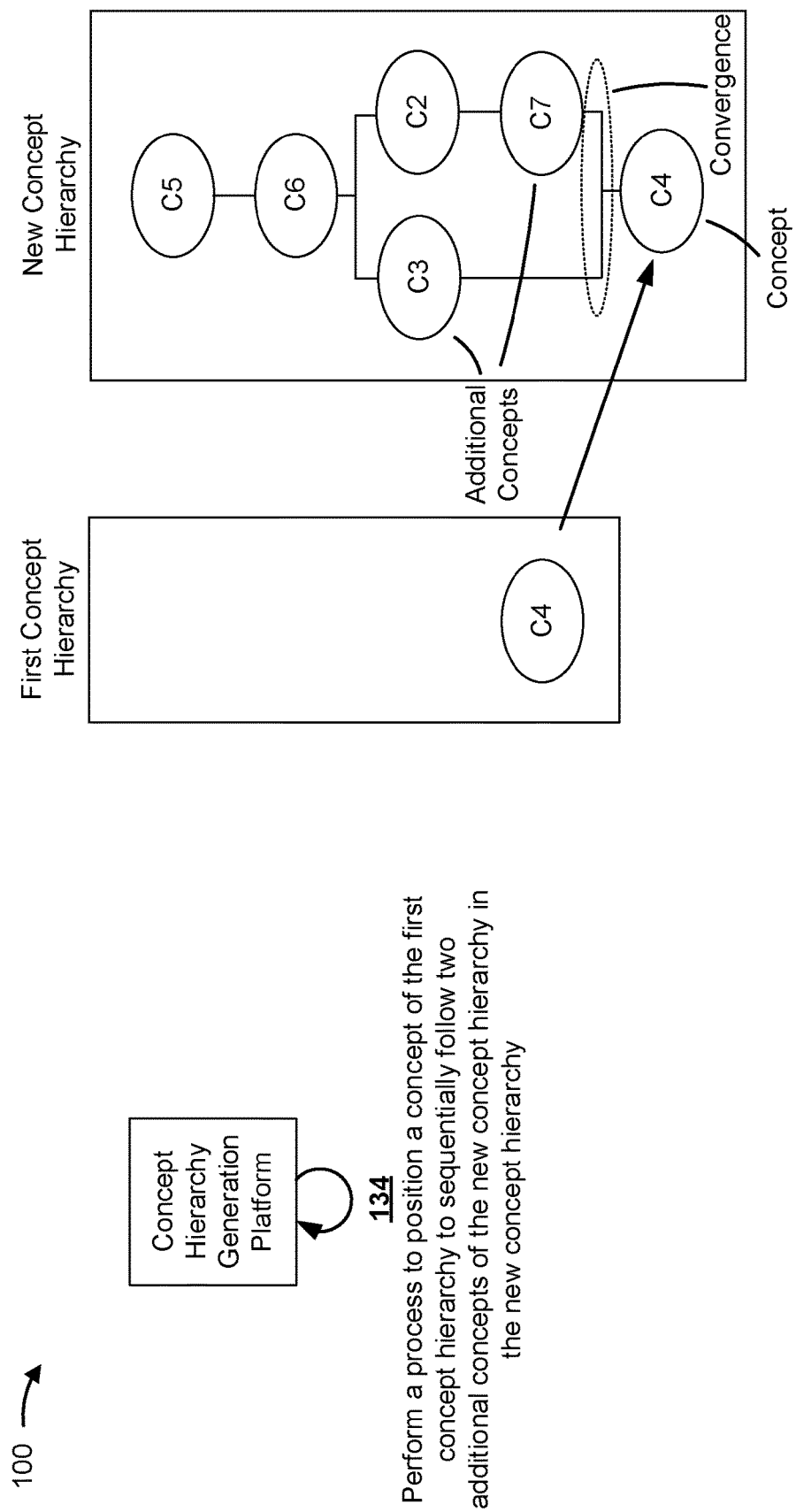

As shown in FIG. 1I and by reference number 134, the concept hierarchy generation platform may perform a process to position a concept (e.g., of the first concept hierarchy) to sequentially follow at least two additional concepts (e.g., of the new concept hierarchy). This is sometimes referred to as a "convergence," because one concept sequentially follows two or more concepts. In some implementations, the concept hierarchy generation platform may perform the process to position the concept to sequentially follow the at least two additional concepts when the concept and a particular concept of the at least two additional concepts are not sufficiently similar to dissolve the concept into the particular concept. For example, the concept hierarchy generation platform may perform the process to position the concept to sequentially follow the at least two additional concepts when a similarity score associated with the concept and the particular concept does not satisfy a threshold (e.g., the similarity score is less than the threshold).

In some implementations, the concept hierarchy generation platform may determine one or more additional similarity scores associated with the concept (e.g., of the first concept hierarchy) and one or more other concepts of the new concept hierarchy. The concept hierarchy generation platform may determine that the similarity score associated with the concept and the particular concept (e.g., of the at least two additional concepts of the new concept hierarchy) matches, within a tolerance (e.g., within a percentage tolerance, such as within a 5% tolerance), at least one similarity score of the one or more additional similarity scores (e.g. the similarity score associated with the concept from the first concept hierarchy and the particular concept from the new concept hierarchy matches at least one similarity score associated with the concept and at least one additional concept of the new concept hierarchy). Accordingly, the concept hierarchy generation platform may position the concept to sequentially follow the at least two additional concepts (e.g., the particular concept and the at least one additional concept).

For example, as shown in FIG. 1I, the concept hierarchy generation platform positions concept C4 of the first concept hierarchy (e.g., the "concept" described above) to sequentially follow concepts C3 and C7 of the new concept hierarchy (e.g., the "at least two concepts" described above). In this case, the concept hierarchy generation platform determined that concept C4 (e.g., the next concept available in the first concept hierarchy) had respective similarity scores with concept C3 and concept C7 that matched each other, within a tolerance, and that were higher than with any other concept in the new concept hierarchy, which enabled the concept hierarchy generation platform to determine to create a convergence of concepts C3 and C7 to concept C4.

In some implementations, after building the new construction hierarchy, the concept hierarchy generation platform may save the new concept hierarchy in a data structure. The data structure may be associated with the concept hierarchy generation platform and/or the server device. In some implementations, a user, using a user device, may access the data structure to interact with the new concept hierarchy to consume one or more media items associated with the new concept hierarchy. For example, the user may sequentially consume the one or more media associated with one or more concepts of the new concept hierarchy as the one or more concepts are sequentially ordered in the new concept hierarchy.

In some implementations, the concept hierarchy generation platform may determine a recommended media presentation (also referred to a recommended media data), such as a recommended training presentation (also referred to as a recommended training data), based on the new concept hierarchy. For example, the concept hierarchy generation platform may determine the recommended media presentation to include the one or more media associated with one or more concepts of the new concept hierarchy as the one or more concepts are sequentially ordered in the new concept hierarchy.

Additionally, or alternatively, the concept hierarchy generation platform may receive historical training data (e.g., feedback data) relating to consumption of concepts included in the new concept hierarchy by one or more users. The concept hierarchy generation platform may determine a starting concept (e.g., a most popular concept, a highest rated concept, and/or the like) based on the historical training data. The concept hierarchy generation platform may receive a user training query regarding the recommended media presentation and may determine intent data (e.g., an area of interest of the user) based on the user training query. The concept hierarchy generation platform may determine a goal concept (e.g., a concept mostly likely to be of interest to the user) based on the intent data and may determine a recommended training presentation (also referred to as a recommended training data) based on the starting concept, the goal concept, and the new concept hierarchy. For example, the concept hierarchy generation platform may determine a recommended training presentation that begins with the starting concept and takes a particular route (e.g., a most popular route, a highest rate route, and/or the like) through the new concept hierarchy to the goal concept.

As indicated above, FIGS. 1A-1I are provided merely as one or more examples. Other examples may differ from what is described with regard to FIGS. 1A-1I.

Figure 2:
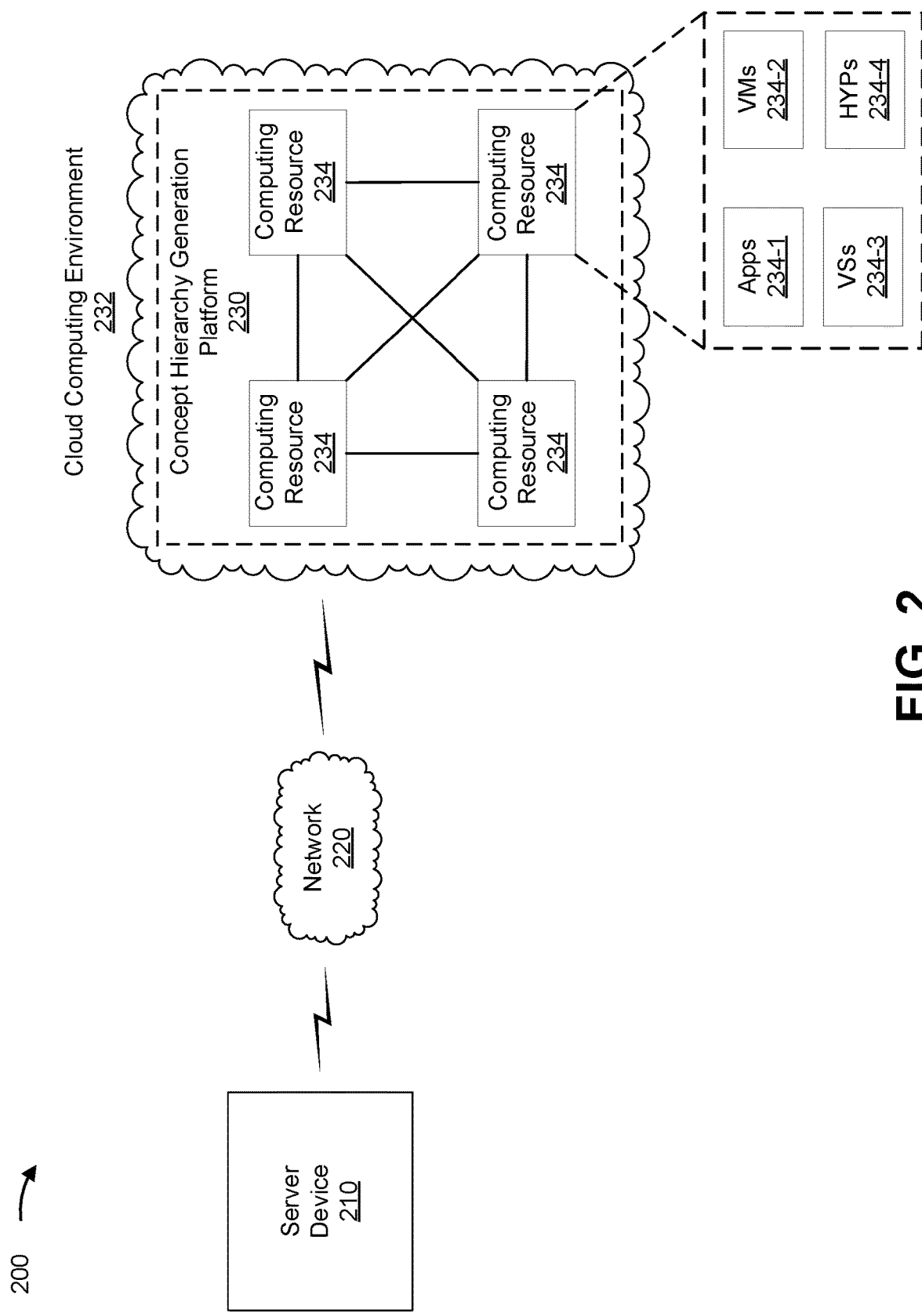
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a network 220, a concept hierarchy generation platform 230 in a cloud computing environment 232 that includes computing resources 234, and/or the like. Devices of environment 200 may interconnect via wired connections, wireless connections, or a combination of wired and wireless connections.

Server device 210 includes one or more devices capable of receiving, generating, storing, processing, and/or providing information, such as information described herein. For example, server device 210 may include a laptop computer, a tablet computer, a desktop computer, a server, a group of servers, or a similar type of device. In some implementations, server device 210 may receive information from and/or transmit information to concept hierarchy generation platform 230.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Concept hierarchy generation platform 230 includes one or more devices capable of performing processing of information described herein. For example, concept hierarchy generation platform 230 may include a server or a group of servers. In some implementations, concept hierarchy generation platform 230 may be designed to be modular such that certain software components may be swapped in or out depending on a particular need. As such, concept hierarchy generation platform 230 may be easily and/or quickly reconfigured for different uses. In some implementations, concept hierarchy generation platform 230 may receive information from and/or transmit information to server device 140, such as via network 220.

In some implementations, as shown, concept hierarchy generation platform 230 may be hosted in a cloud computing environment 232. Notably, while implementations described herein describe concept hierarchy generation platform 230 as being hosted in cloud computing environment 232, in some implementations, concept hierarchy generation platform 230 may be non-cloud-based (i.e., may be implemented outside of a cloud computing environment) or may be partially cloud-based.

Cloud computing environment 232 includes an environment that hosts concept hierarchy generation platform 230. Cloud computing environment 232 may provide computation, software, data access, storage, etc. services that do not require end-user knowledge of a physical location and configuration of system(s) and/or device(s) that hosts concept hierarchy generation platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host concept hierarchy generation platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed server device 210. Application 234-1 may eliminate a need to install and execute the software applications on server device 210. For example, application 234-1 may include software associated with concept hierarchy generation platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user, and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
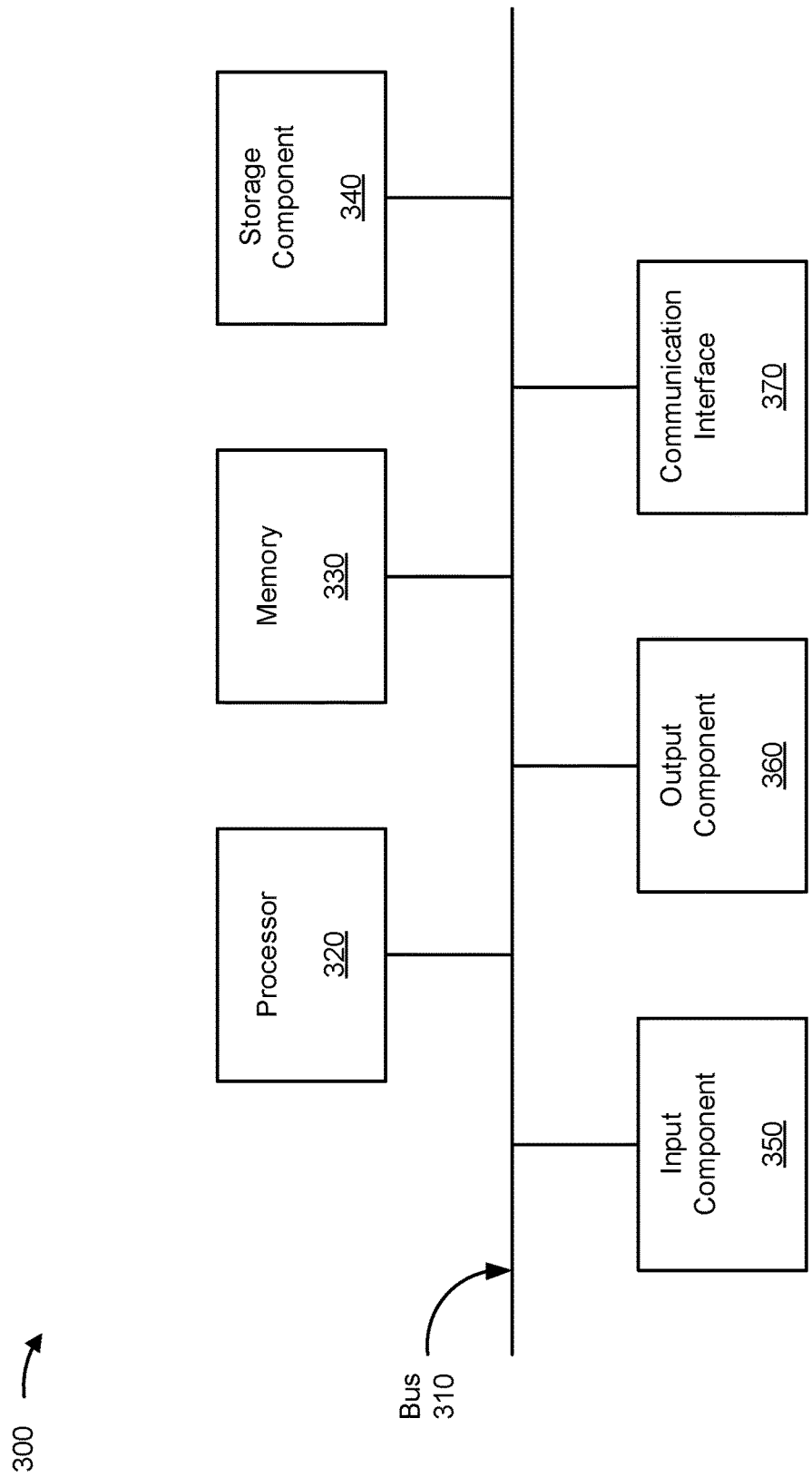
FIG. 3 is a diagram of example components of one or more devices of FIG. 2.

FIG. 3 is a diagram of example components of a device 300. Device 300 may correspond to server device 210, concept hierarchy generation platform 230, and/or the like. In some implementations, server device 210, concept hierarchy generation platform 230, and/or the like may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
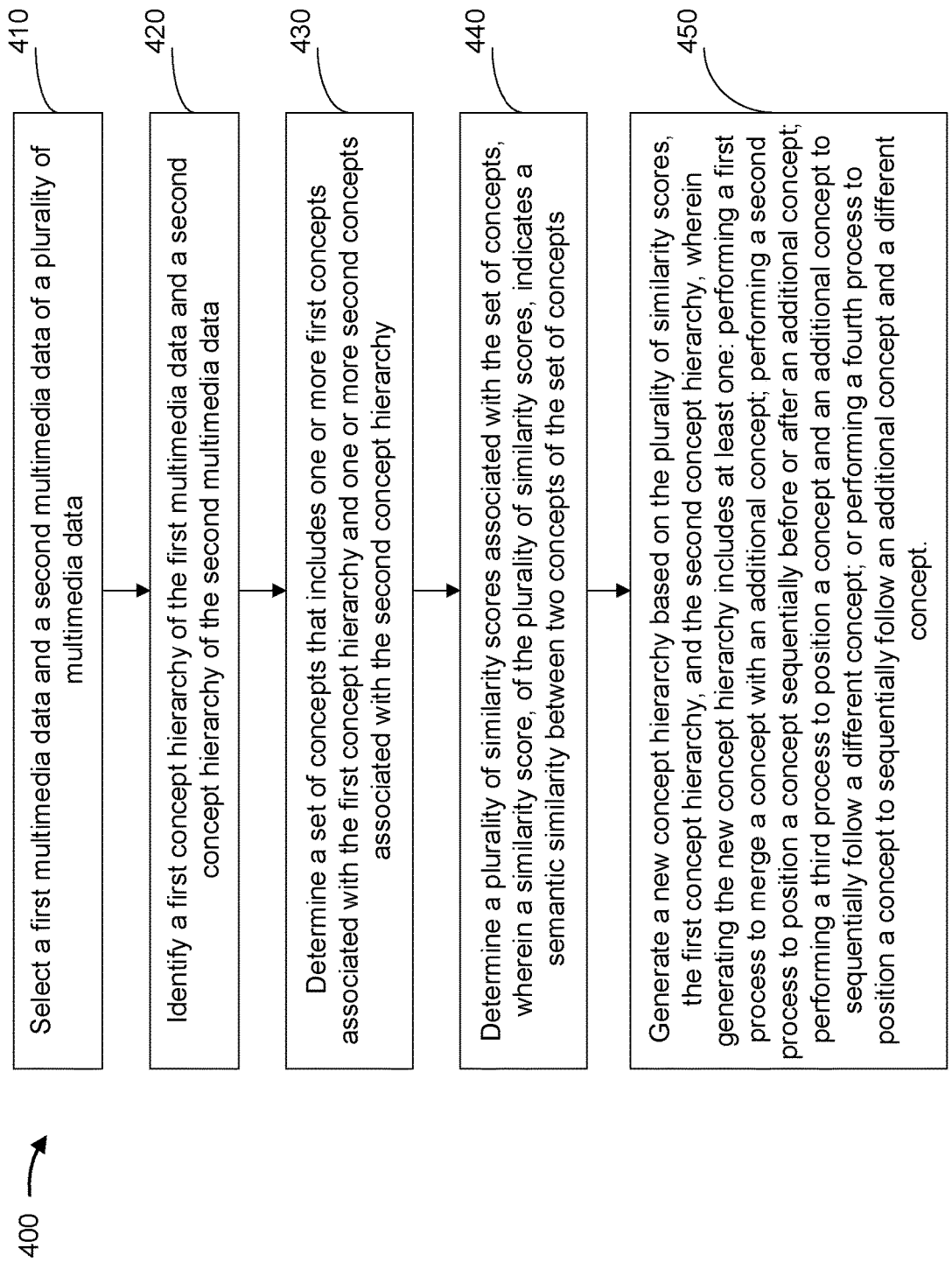
FIGS. 4, 5, 6A, and 6B are flow charts of example processes for facilitating merging of concept hierarchies.

FIG. 4 is a flow chart of an example process 400 for facilitating merging of concept hierarchies. In some implementations, one or more process blocks of FIG. 4 may be performed by a concept hierarchy generation platform (e.g., concept hierarchy generation platform 230). In some implementations, one or more process blocks of FIG. 4 may be performed by another device or a group of devices separate from or including the concept hierarchy generation platform, such as server device 210, and/or the like.

As shown in FIG. 4, process 400 may include selecting a first multimedia data and a second multimedia data of a plurality of multimedia data (block 410). For example, the concept hierarchy generation platform (e.g., using computing resource 234, processor 320, memory 330, storage component 340, input component 350, output component 360, communication interface 370 and/or the like) may select a first multimedia data and a second multimedia data of a plurality of multimedia data, as described above.

As further shown in FIG. 4, process 400 may include identifying a first concept hierarchy of the first multimedia data and a second concept hierarchy of the second multimedia data (block 420). For example, the concept hierarchy generation platform (e.g., using computing resource 234, processor 320, memory 330, storage component 340, input component 350, output component 360, communication interface 370 and/or the like) may identify a first concept hierarchy of the first multimedia data and a second concept hierarchy of the second multimedia data, as described above.

As further shown in FIG. 4, process 400 may include determining a set of concepts that includes one or more first concepts associated with the first concept hierarchy and one or more second concepts associated with the second concept hierarchy (block 430). For example, the concept hierarchy generation platform (e.g., using computing resource 234, processor 320, memory 330, storage component 340, input component 350, output component 360, communication interface 370 and/or the like) may determine a set of concepts that includes one or more first concepts associated with the first concept hierarchy and one or more second concepts associated with the second concept hierarchy, as described above.

As further shown in FIG. 4, process 400 may include determining a plurality of similarity scores associated with the set of concepts wherein a similarity score, of the plurality of similarity scores, indicates a semantic similarity between two concepts of the set of concepts (block 440). For example, the concept hierarchy generation platform (e.g., using computing resource 234, processor 320, memory 330, storage component 340, input component 350, output component 360, communication interface 370 and/or the like) may determine a plurality of similarity scores associated with the set of concepts, as described above. In some implementations, a similarity score, of the plurality of similarity scores, indicates a semantic similarity between two concepts of the set of concepts.

As further shown in FIG. 4, process 400 may include generating a new concept hierarchy based on the plurality of similarity scores, the first concept hierarchy, and the second concept hierarchy, wherein generating the new concept hierarchy includes at least one of: performing a first process to merge a concept with an additional concept, performing a second process to position a concept sequentially before or after an additional concept, performing a third process to position a concept and an additional concept to sequentially follow a different concept; or performing a fourth process to position a concept to sequentially follow an additional concept and a different concept (block 450). For example, the concept hierarchy generation platform (e.g., using computing resource 234, processor 320, memory 330, storage component 340, input component 350, output component 360, communication interface 370 and/or the like) may generate a new concept hierarchy based on the plurality of similarity scores, the first concept hierarchy, and the second concept hierarchy, as described above. In some implementations, generating the new concept hierarchy includes at least one of: performing a first process to merge a concept with an additional concept, performing a second process to position a concept sequentially before or after an additional concept, performing a third process to position a concept and an additional concept to sequentially follow a different concept, or performing a fourth process to position a concept to sequentially follow an additional concept and a different concept.

Process 400 may include additional implementations, such as any single implementation or any combination of implementations described below and/or in connection with one or more other processes described elsewhere herein.

In a first implementation, determining the plurality of similarity scores associated with the set of concepts comprises determining a set of concept pairs that includes all possible pairs of concepts from the set of concepts and processing, for each concept pair in the set of concept pairs, the concept pair using a latent Dirichlet allocation (LDA) technique to determine a similarity score for the concept pair.

In a second implementation, alone or in combination with the first implementation, performing the first process to merge the concept with the additional concept comprises: determining that a particular similarity score, of the plurality of similarity scores, satisfies a threshold, wherein the particular similarity score is associated with a first concept of the one or more first concepts and a second concept of one or more concepts associated with the new concept hierarchy; determining one or more first keywords associated with the first concept; causing the one or more first keywords to be added to one or more second keywords associated with the second concept; and causing the first concept to be removed from the set of concepts.

In a third implementation, alone or in combination with one or more of the first and second implementations, process 400 may further include determining that the one or more first keywords are not associated with the second concept.

In a fourth implementation, alone or in combination with one or more of the first through third implementations, performing the second process to position the concept sequentially before or after the additional concept comprises determining that a particular similarity score, of the plurality of similarity scores, does not satisfy a threshold, wherein the particular similarity score is associated with a first concept, of the one or more first concepts, and a second concept of one or more concepts associated with the new concept hierarchy; determining a first set of elements and a second set of elements of the first concept; determining a first set of elements and a second set of elements of the second concept; determining a first element similarity score based on the first set of elements of the first concept and the second set of elements of the second concept; determining a second element similarity score based on the second set of elements of the first concept and the first set of elements of the second concept; and causing, based on the first element similarity score and the second element similarity score, the first concept to be positioned sequentially before or after the second concept. In some implementations, the first concept sequentially follows the second concept when the first element similarity score is greater than or equal to the second element similarity score. In some implementations, the second concept sequentially follows the first concept when the first element similarity score is less than the second element similarity score.

In a fifth implementation, alone or in combination with one or more of the first through fourth implementations, performing the third process to position the concept and the additional concept to sequentially follow the different concept comprises determining that a particular similarity score, of the plurality of similarity scores, does not satisfy a threshold, wherein the particular similarity score is associated with a first concept, of the one or more first concepts, and a second concept of one or more concepts associated with the new concept hierarchy; determining one or more additional similarity scores, of the plurality of similarity scores, associated with the second concept and one or more additional second concepts of the one or more second concepts; determining that the particular similarity score matches, within a tolerance, an additional similarity score, of the one or more additional similarity scores, that is associated with an additional second concept of the one or more additional second concepts; and causing, based on the particular similarity score matching the additional similarity score, the first concept and the additional second concept to sequentially follow the second concept.

In a sixth implementation, alone or in combination with one or more of the first through fifth implementations, performing the fourth process to position the concept to sequentially follow from the additional concept and the different concept comprises determining that a particular similarity score, of the plurality of similarity scores, does not satisfy a threshold, wherein the particular similarity score is associated with a first concept, of the one or more first concepts, and a second concept of the one or more second concepts; determining one or more additional similarity scores, of the plurality of similarity scores, associated with the first concept and one or more additional second concepts of the one or more second concepts; determining that the particular similarity score matches, within a tolerance, an additional similarity score, of the one or more additional similarity scores, that is associated with an additional second concept of the one or more additional second concepts; and causing, based on the particular similarity score matching the additional similarity score, the first concept to sequentially follow from the second concept and the additional second concept.

In a seventh implementation, alone or in combination with one or more of the first through sixth implementations, process 400 may further include, wherein the first concept hierarchy includes a first table of contents part and the second concept hierarch includes a second table of contents part, identifying the one or more first concepts in the first table of contents; and identifying the one or more second concepts in the second table of contents.

In an eighth implementation, alone or in combination with one or more of the first through seventh implementations, process 400 may further include determining a recommended training data based on the new concept hierarchy.

In a ninth implementation, alone or in combination with one or more of the first through eighth implementations, process 400 may further include, receiving historical training data; determining a starting concept based on the historical training data, receiving a user training query; determining intent data based on the user training query; determining a goal concept based on the intent data; and determining a recommended training data based on the starting concept, the goal concept, and the new concept hierarchy.

In a tenth implementation, alone or in combination with one or more of the first through ninth implementations, process 400 may further include, wherein the first multimedia data comprises a video data, extracting a plurality of topic fragments from the video data; and combining one or more of the plurality of topic fragments into one or more amalgamated video sections based on a time parameter of one or more of the plurality of topic fragments.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
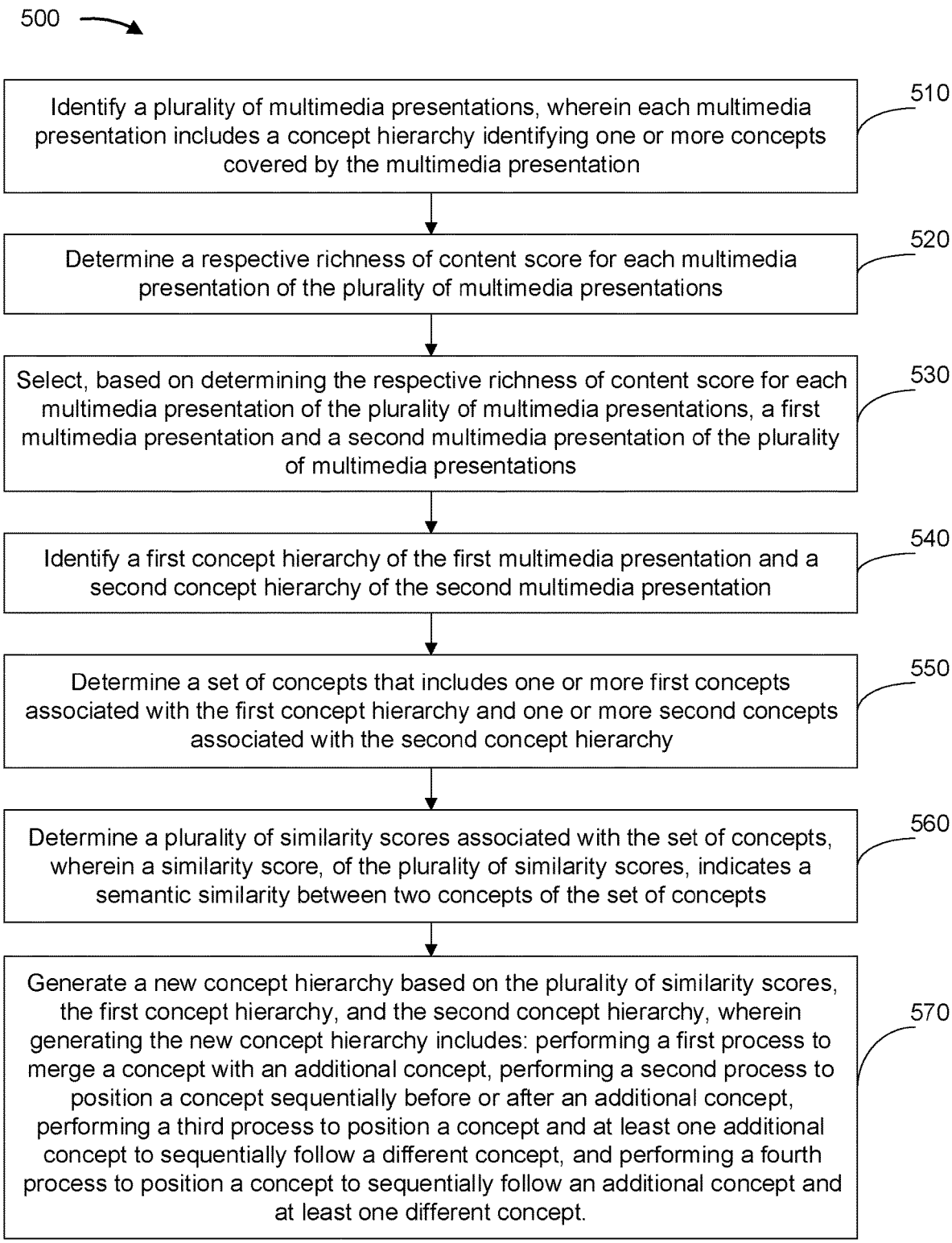

FIG. 5 is a flow chart of an example process 500 for facilitating merging of concept hierarchies. In some implementations, one or more process blocks of FIG. 5 may be performed by a concept hierarchy generation platform (e.g., concept hierarchy generation platform 230). In some implementations, one or more process blocks of FIG. 5 may be performed by another device or a group of devices separate from or including the concept hierarchy generation platform, such as server device 210 and/or the like.

As shown in FIG. 5, process 500 may include identifying a plurality of multimedia presentations, wherein each multimedia presentation includes a concept hierarchy identifying one or more concepts covered by the multimedia presentation (block 510). For example, the concept hierarchy generation platform (e.g., using computing resource 234, processor 320, memory 330, storage component 340, input component 350, output component 360, communication interface 370 and/or the like) may identify a plurality of multimedia presentations, as described above. In some implementations, each multimedia presentation includes a concept hierarchy identifying one or more concepts covered by the multimedia presentation.

As further shown in FIG. 5, process 500 may include determining a respective richness of content score for each multimedia presentation of the plurality of multimedia presentations (block 520). For example, the concept hierarchy generation platform (e.g., using computing resource 234, processor 320, memory 330, storage component 340, input component 350, output component 360, communication interface 370 and/or the like) may determine a respective richness of content score for each multimedia presentation of the plurality of multimedia presentations, as described above.

As further shown in FIG. 5, process 500 may include selecting, based on determining the respective richness of content score for each multimedia presentation of the plurality of multimedia presentations, a first multimedia presentation and a second multimedia presentation of the plurality of multimedia presentations (block 530). For example, the concept hierarchy generation platform (e.g., using computing resource 234, processor 320, memory 330, storage component 340, input component 350, output component 360, communication interface 370 and/or the like) may select, based on determining the respective richness of content score for each multimedia presentation of the plurality of multimedia presentations, a first multimedia presentation and a second multimedia presentation of the plurality of multimedia presentations, as described above.

As further shown in FIG. 5, process 500 may include identifying a first concept hierarchy of the first multimedia presentation and a second concept hierarchy of the second multimedia presentation (block 540). For example, the concept hierarchy generation platform (e.g., using computing resource 234, processor 320, memory 330, storage component 340, input component 350, output component 360, communication interface 370 and/or the like) may identify a first concept hierarchy of the first multimedia presentation and a second concept hierarchy of the second multimedia presentation, as described above.

As further shown in FIG. 5, process 500 may include determining a set of concepts that includes one or more first concepts associated with the first concept hierarchy and one or more second concepts associated with the second concept hierarchy (block 550). For example, the concept hierarchy generation platform (e.g., using computing resource 234, processor 320, memory 330, storage component 340, input component 350, output component 360, communication interface 370 and/or the like) may determine a set of concepts that includes one or more first concepts associated with the first concept hierarchy and one or more second concepts associated with the second concept hierarchy, as described above.

As further shown in FIG. 5, process 500 may include determining a plurality of similarity scores associated with the set of concepts, wherein a similarity score, of the plurality of similarity scores, indicates a semantic similarity between two concepts of the set of concepts (block 560). For example, the concept hierarchy generation platform (e.g., using computing resource 234, processor 320, memory 330, storage component 340, input component 350, output component 360, communication interface 370 and/or the like) may determine a plurality of similarity scores associated with the set of concepts, as described above. In some implementations, a similarity score, of the plurality of similarity scores, indicates a semantic similarity between two concepts of the set of concepts.

As further shown in FIG. 5, process 500 may include generating a new concept hierarchy based on the plurality of similarity scores, the first concept hierarchy, and the second concept hierarchy wherein generating the new concept hierarchy includes performing a first process to merge a concept with an additional concept, performing a second process to position a concept sequentially before or after an additional concept, performing a third process to position a concept and at least one additional concept to sequentially follow a different concept and performing a fourth process to position a concept to sequentially follow an additional concept and at least one different concept (block 570). For example, the concept hierarchy generation platform (e.g., using computing resource 234, processor 320, memory 330, storage component 340, input component 350, output component 360, communication interface 370 and/or the like) may generate a new concept hierarchy based on the plurality of similarity scores, the first concept hierarchy, and the second concept hierarchy, as described above. In some implementations, generating the new concept hierarchy includes performing a first process to merge a concept with an additional concept, performing a second process to position a concept sequentially before or after an additional concept, performing a third process to position a concept and at least one additional concept to sequentially follow a different concept, and performing a fourth process to position a concept to sequentially follow an additional concept and at least one different concept.

Process 500 may include additional implementations, such as any single implementation or any combination of implementations described below and/or in connection with one or more other processes described elsewhere herein.

In a first implementation, performing the first process to merge the concept with the additional concept comprises determining one or more first keywords associated with a first concept of the one or more first concepts, and causing the one or more first keywords to be added to one or more second keywords associated with a second concept of one or more concepts associated with the new concept hierarchy.

In a second implementation, alone or in combination with the first implementation, performing the second process to position the concept sequentially before or after the additional concept includes determining a first set of elements and a second set of elements of a first concept of the one or more first concepts, determining a first set of elements and a second set of elements of a second concept of one or more concepts associated with the new concept hierarchy, determining a first element similarity score based on the first set of elements of the first concept and the second set of elements of the second concept, determining a second element similarity score based on the second set of elements of the first concept and the first set of elements of the second concept, and causing the first concept to sequentially follow the second concept when the first element similarity score is greater than or equal to the second element similarity score or the second concept to sequentially follow the first concept when the first element similarity score is less than the second element similarity score.

In a third implementation, alone or in combination with one or more of the first and second implementations, performing the third process to position the concept and the at least one additional concept to sequentially follow the different concept includes determining that a particular similarity score matches, within a tolerance, at least one additional similarity score, wherein the particular similarity score is associated with a first concept of the one or more first concepts and a second concept of one or more concepts associated with the new concept hierarchy, and wherein the at least one additional similarity score is associated with the second concept and at least one additional second concept of the one or more concepts associated with the new concept hierarchy. Performing the third process to position the concept and the at least one additional concept to sequentially follow the different concept may further include causing, based on the particular similarity score matching the at least one additional similarity score, the first concept and the at least one additional second concept to sequentially follow the second concept.

In a fourth implementation, alone or in combination with one or more of the first through third implementations, performing the fourth process to position the concept to sequentially follow the additional concept and the at least one different concept includes determining that a particular similarity score matches, within a tolerance, at least one additional similarity score, wherein the particular similarity score is associated with a first concept, of the one or more first concepts, and a second concept of one or more concepts associated with the new concept hierarchy, wherein, the at least one additional similarity score is associated with the first concept and at least one additional second concept of the one or more concepts associated with the new concept hierarchy. Performing the fourth process to position the concept to sequentially follow the additional concept and the at least one different concept may further include causing, based on the particular similarity score matching the at least one additional similarity score, the first concept to sequentially follow the second concept and the at least one additional second concept.

In a fifth implementation, alone or in combination with one or more of the first through fourth implementations, determining the respective richness of content score for each multimedia presentation of the plurality of multimedia presentations includes determining, for each multimedia presentation of the plurality of multimedia presentations, one or more media items associated with the multimedia presentation, identifying a reference media item, determining for each media item, of the one or more media items, a respective ratio of concepts covered by the reference media item that are also covered by the media item, and determining, based on the respective ratios of the one or more media items, the respective richness of content score of the multimedia presentation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
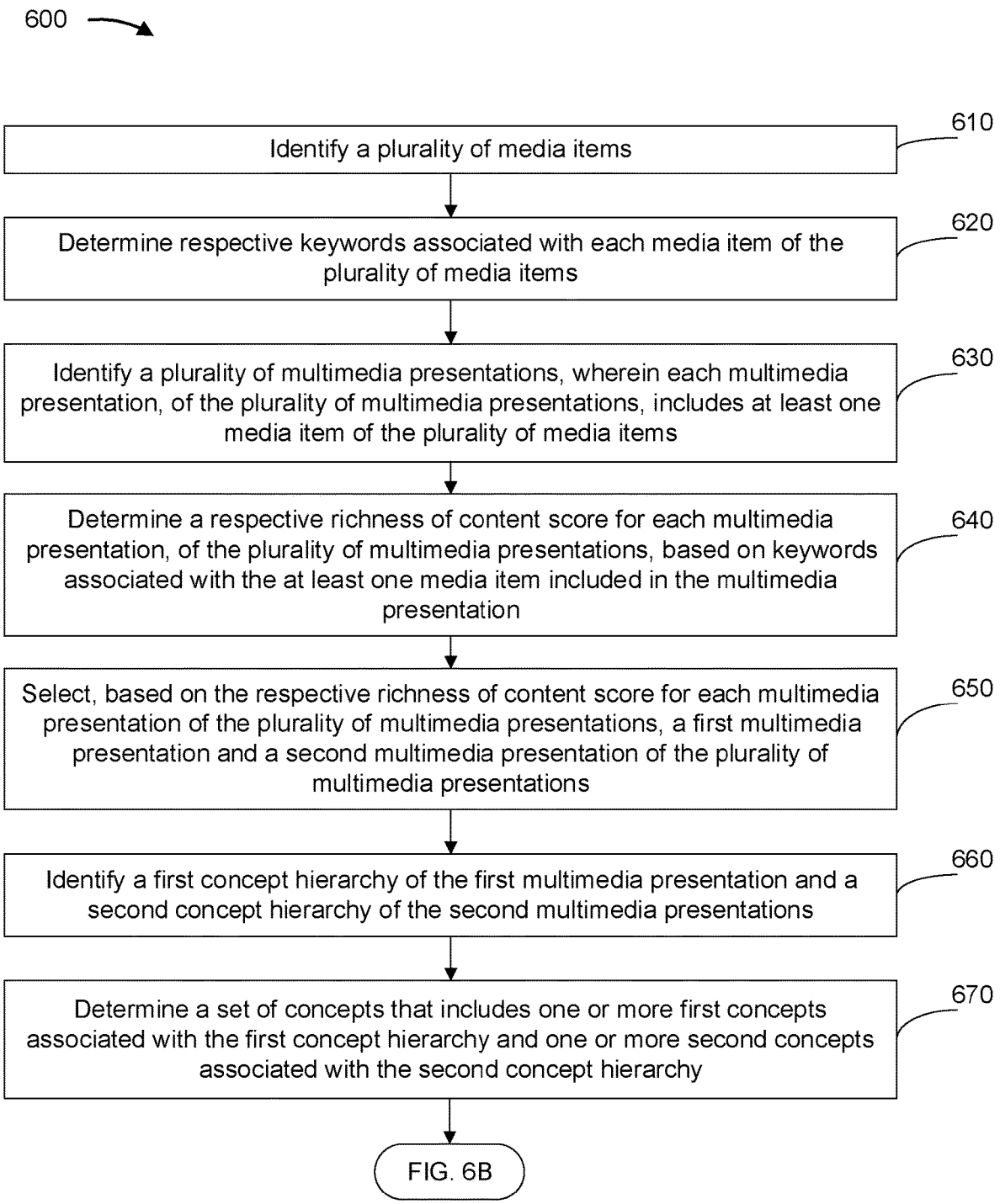
Figure 6B:
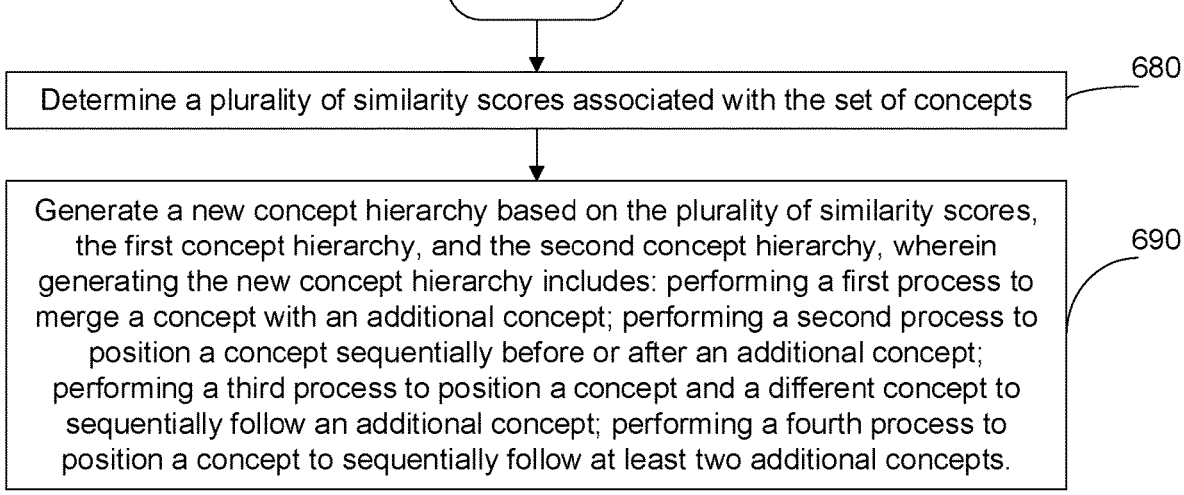

FIGS. 6A and 6B show a flow chart of an example process 600 for facilitating merging of concept hierarchies. In some implementations, one or more process blocks of FIGS. 6A-6B may be performed by a concept hierarchy generation platform (e.g., concept hierarchy generation platform 230). In some implementations, one or more process blocks of FIGS. 6A-6B may be performed by another device or a group of devices separate from or including the concept hierarchy generation platform, such as server device 210 and/or the like.

As shown in FIG. 6A, process 600 may include identifying a plurality of media items (block 610). For example, the concept hierarchy generation platform (e.g., using computing resource 234, processor 320, memory 330, storage component 340, input component 350, output component 360, communication interface 370 and/or the like) may identify a plurality of media items, as described above.

As further shown in FIG. 6A, process 600 may include determining respective keywords associated with each media item of the plurality of media items (block 620). For example, the concept hierarchy generation platform (e.g., using computing resource 234, processor 320, memory 330, storage component 340, input component 350, output component 360, communication interface 370 and/or the like) may determine respective keywords associated with each media item of the plurality of media items, as described above.

As further shown in FIG. 6A, process 600 may include identifying a plurality of multimedia presentations, wherein each multimedia presentation, of the plurality of multimedia presentations, includes at least one media item of the plurality of media items (block 630). For example, the concept hierarchy generation platform (e.g., using computing resource 234, processor 320, memory 330, storage component 340, input component 350, output component 360, communication interface 370 and/or the like) may identify a plurality of multimedia presentations, as described above. In some implementations, each multimedia presentation, of the plurality of multimedia presentations, includes at least one media item of the plurality of media items.

As further shown in FIG. 6A, process 600 may include determining a respective richness of content score for each multimedia presentation, of the plurality of multimedia presentations, based on keywords associated with the at least one media item included in the multimedia presentation (block 640). For example, the concept hierarchy generation platform (e.g., using computing resource 234, processor 320, memory 330, storage component 340, input component 350, output component 360, communication interface 370 and/or the like) may determine a respective richness of content score for each multimedia presentation, of the plurality of multimedia presentations, based on keywords associated with the at least one media item included in the multimedia presentation, as described above.

As further shown in FIG. 6A, process 600 may include selecting, based on the respective richness of content score for each multimedia presentation of the plurality of multimedia presentations, a first multimedia presentation and a second multimedia presentation of the plurality of multimedia presentations (block 650). For example, the concept hierarchy generation platform (e.g., using computing resource 234, processor 320, memory 330, storage component 340, input component 350, output component 360, communication interface 370 and/or the like) may select, based on the respective richness of content score for each multimedia presentation of the plurality of multimedia presentations, a first multimedia presentation and a second multimedia presentation of the plurality of multimedia presentations, as described above.

As further shown in FIG. 6A, process 600 may include identifying a first concept hierarchy of the first multimedia presentation and a second concept hierarchy of the second multimedia presentations (block 660). For example, the concept hierarchy generation platform (e.g., using computing resource 234, processor 320, memory 330, storage component 340, input component 350, output component 360, communication interface 370 and/or the like) may identify a first concept hierarchy of the first multimedia presentation and a second concept hierarchy of the second multimedia presentations, as described above.

As further shown in FIG. 6A, process 600 may include determining a set of concepts that includes one or more first concepts associated with the first concept hierarchy and one or more second concepts associated with the second concept hierarchy (block 670). For example, the concept hierarchy generation platform (e.g., using computing resource 234, processor 320, memory 330, storage component 340, input component 350, output component 360, communication interface 370 and/or the like) may determine a set of concepts that includes one or more first concepts associated with the first concept hierarchy and one or more second concepts associated with the second concept hierarchy, as described above.

As further shown in FIG. 6B, process 600 may include determining a plurality of similarity scores associated with the set of concepts (block 680). For example, the concept hierarchy generation platform (e.g., using computing resource 234, processor 320, memory 330, storage component 340, input component 350, output component 360, communication interface 370 and/or the like) may determine a plurality of similarity scores associated with the set of concepts, as described above.

As further shown in FIG. 6B, process 600 may include generating a new concept hierarchy based on the plurality of similarity scores, the first concept hierarchy, and the second concept hierarchy, wherein generating the new concept hierarchy includes: performing a first process to merge a concept with an additional concept, performing a second process to position a concept sequentially before or after an additional concept, performing a third process to position a concept and a different concept to sequentially follow an additional concept, and performing a fourth process to position a concept to sequentially follow at least two additional concepts (block 690). For example, the concept hierarchy generation platform (e.g., using computing resource 234, processor 320, memory 330, storage component 340, input component 350, output component 360, communication interface 370 and/or the like) may generate a new concept hierarchy based on the plurality of similarity scores, the first concept hierarchy, and the second concept hierarchy, as described above. In some implementations, generating the new concept hierarchy includes performing a first process to merge a concept with an additional concept, performing a second process to position a concept sequentially before or after an additional concept, performing a third process to position a concept and a different concept to sequentially follow an additional concept, and performing a fourth process to position a concept to sequentially follow at least two additional concepts, as described above.

Process 600 may include additional implementations, such as any single implementation or any combination of implementations described below and/or in connection with one or more other processes described elsewhere herein.

In a first implementation, determining respective content information associated with each media item of the plurality of media items includes determining, for a video item of the plurality of media items, a plurality of video fragments and a plurality of video fragment transcripts, wherein a particular video fragment, of the plurality of video fragments, is associated with a particular video fragment transcript, of the plurality of video fragment transcripts; generating, for the video item and based on the one or more video fragments, at least one video fragment nugget, wherein the at least one video fragment nugget includes one or more video fragments, of the plurality of video fragments, and one or more video fragment transcripts, of the plurality of video fragment transcripts, that are associated with the one or more video fragments; and determining one or more keywords associated with the at least one video fragment nugget.

In a second implementation, alone or in combination with the first implementation, the one or more instructions, generating the at least one video fragment nugget includes determining a threshold distance based on a distance between each adjacent video fragment of the plurality of video fragments, and causing at least two video adjacent video fragments, of the plurality of video fragments, and at least two respectively associated video fragment transcripts to be joined together to form a video fragment nugget, wherein a distance between the video fragment nugget and a particular adjacent video fragment, of the plurality of video fragments, satisfies the threshold distance.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, first multimedia data and second multimedia data,
wherein the first multimedia data comprises video data;
extracting, by the device, a plurality of topic fragments from the video data;
combining, by the device, one or more of the plurality of topic fragments into one or more amalgamated video sections based on an amount of time between a starting time of a first one of the one or more of the plurality of topic fragments and a starting time of a second one of the one or more of the plurality of topic fragments;
identifying, by the device and based on combining the one or more of the plurality of topic fragments into the one or more amalgamated video sections, a first concept hierarchy, associated with the first multimedia data, and a second concept hierarchy associated with the second multimedia data,
wherein the first concept hierarchy is independent from the second concept hierarchy, and
wherein the first concept hierarchy includes one or more first concepts, and the second concept hierarchy includes one or more second concepts;
determining, by the device, a set of concepts that includes the one or more first concepts and the one or more second concepts;
determining, by the device, a plurality of similarity scores associated with the set of concepts,
wherein a similarity score, of the plurality of similarity scores, indicates a semantic similarity between two concepts of the set of concepts; and
generating, by the device, a new concept hierarchy based on the plurality of similarity scores, the first concept hierarchy, and the second concept hierarchy,
wherein generating the new concept hierarchy includes at least one of:
performing a first process to merge a first concept, of the one or more first concepts, with a second concept, of the one or more second concepts;

performing a second process to position the first concept sequentially before or after the second concept;
performing a third process to position the first concept and an additional first concept, of the one or more first concepts, to sequentially follow the second concept; or
performing a fourth process to position the first concept to sequentially follow the additional first concept and the second concept.

2. A device, comprising:
one or more memories; and
one or more processors communicatively coupled to the one or more memories, configured to:
identify a plurality of multimedia presentations, comprising a first multimedia presentation and a second multimedia presentation, including a plurality of concept hierarchies comprising a first concept hierarchy and a second concept hierarchy independent from the first concept hierarchy,
wherein the first multimedia presentation includes the first concept hierarchy, and the second multimedia presentation includes the second concept hierarchy, and
wherein the first concept hierarchy identifies one or more first concepts, and the second concept hierarchy identifies one or more second concepts;
determine a respective richness of content score for each multimedia presentation of the plurality of multimedia presentations;
select, based on determining the respective richness of content score for each multimedia presentation of the plurality of multimedia presentations, the first multimedia presentation and the second multimedia presentation,
wherein the first multimedia presentation comprises video data;
extract a plurality of topic fragments from the video data;
combine one or more of the plurality of topic fragments into one or more amalgamated video sections based on an amount of time between a starting time of a first one of the one or more of the plurality of topic fragments and a starting time of a second one of one or more of the plurality of topic fragments;
identify, based on combining the one or more of the plurality of topic fragments into the one or more amalgamated video sections, the first concept hierarchy and the second concept hierarchy;
determine a set of concepts that includes the one or more first concepts and the one or more second concepts;
determine a plurality of similarity scores associated with the set of concepts,
wherein a similarity score, of the plurality of similarity scores, indicates a semantic similarity between two concepts of the set of concepts; and
generate a new concept hierarchy based on the plurality of similarity scores, the first concept hierarchy, and the second concept hierarchy,
wherein the one or more processors, to generate the new concept hierarchy, are configured to:
perform a first process to merge a first concept, of the one or more first concepts, with a second concept of the one or more second concepts,
perform a second process to position the first concept sequentially before or after the second concept,
perform a third process to position the first concept and an additional first concept, of the one or more first concepts, to sequentially follow the second concept, and
perform a fourth process to position the first concept to sequentially follow the additional first concept and the second concept.

3. A non-transitory computer-readable medium storing instructions, the instructions comprising:
one or more instructions that, when executed by one or more processors, cause the one or more processors to:
identify a plurality of media items;
determine respective keywords associated with each media item of the plurality of media items;
identify, based on determining the respective keywords, a plurality of multimedia presentations,
wherein each multimedia presentation, of the plurality of multimedia presentations, includes at least one media item of the plurality of media items;
determine a respective richness of content score for each multimedia presentation, of the plurality of multimedia presentations, based on keywords associated with the at least one media item included in a respective multimedia presentation;
select, based on the respective richness of content score for each multimedia presentation of the plurality of multimedia presentations, a first multimedia presentation and a second multimedia presentation of the plurality of multimedia presentations,
wherein the first multimedia presentation comprises video data;
extract a plurality of topic fragments from the video data;
combine one or more of the plurality of topic fragments into one or more amalgamated video sections based on an amount of time between a starting time of a first one of the one or more of the plurality of topic fragments and a starting time of a second one of one or more of the plurality of topic fragments;
identify, based on combining the one or more of the plurality of topic fragments into the one or more amalgamated video sections, a first concept hierarchy, of the first multimedia presentation, and a second concept hierarchy, of the second multimedia presentation, independent from the first concept hierarchy;
determine a set of concepts that includes one or more first concepts, associated with the first concept hierarchy, and one or more second concepts associated with the second concept hierarchy;
determine a plurality of similarity scores associated with the set of concepts; and
generate a new concept hierarchy based on the plurality of similarity scores, the first concept hierarchy, and the second concept hierarchy,
wherein the one or more instructions, that cause the one or more processors to generate the new concept hierarchy, cause the one or more processors to:
perform a first process to merge a first concept, of the one or more first concepts, with a second concept of the one or more second concepts;

perform a second process to position the first concept sequentially before or after the second concept;
perform a third process to position the first concept and an additional first concept, of the one or more first concepts, to sequentially follow the second concept; and
perform a fourth process to position the first concept to sequentially follow the second concept.

4. The method of claim 1, wherein determining the plurality of similarity scores associated with the set of concepts comprises:
determining a set of concept pairs that includes all possible pairs of concepts from the set of concepts; and
processing, for each concept pair in the set of concept pairs, a concept pair using a latent Dirichlet allocation technique to determine the similarity score for the concept pair.

5. The method of claim 1, wherein performing the first process to merge the first concept with the second concept comprises:
determining that a particular similarity score, of the plurality of similarity scores, satisfies a threshold,
wherein the particular similarity score is associated with the first concept and the second concept;
determining one or more first keywords associated with the first concept;
causing the one or more first keywords to be added to one or more second keywords associated with the second concept; and
causing the first concept to be removed from the set of concepts.

6. The method of claim 1, wherein performing the second process to position the first concept sequentially before or after the second concept comprises:
determining that a particular similarity score, of the plurality of similarity scores, does not satisfy a threshold,
wherein the particular similarity score is associated with the first concept and the second concept;
determining a first set of elements and a second set of elements of the first concept;
determining a first set of elements and a second set of elements of the second concept;
determining a first element similarity score based on the first set of elements of the first concept and the second set of elements of the second concept;
determining a second element similarity score based on the second set of elements of the first concept and the first set of elements of the second concept; and
causing, based on the first element similarity score and the second element similarity score, the first concept to be positioned sequentially before or after the second concept,
wherein the first concept sequentially follows the second concept when the first element similarity score is greater than or equal to the second element similarity score, or
wherein the second concept sequentially follows the first concept when the first element similarity score is less than the second element similarity score.

7. The method of claim 1, wherein performing the third process to position the first concept and the additional first concept to sequentially follow the second concept comprises:
determining that a particular similarity score, of the plurality of similarity scores, does not satisfy a threshold,
wherein the particular similarity score is associated with the first concept and the second concept;
determining an additional similarity score, of the plurality of similarity scores, associated with the first concept and the additional first concept;
determining that the particular similarity score matches, within a tolerance, the additional similarity score; and
causing, based on the particular similarity score matching the additional similarity score within the tolerance, the first concept and the additional first concept to sequentially follow the second concept.

8. The method of claim 1, wherein performing the fourth process to position the first concept to sequentially follow the additional first concept and the second concept comprises:
determining that a particular similarity score, of the plurality of similarity scores, does not satisfy a threshold,
wherein the particular similarity score is associated with the first concept and the second concept;
determining an additional similarity score, of the plurality of similarity scores, associated with the first concept and the additional first concept;
determining that the particular similarity score matches, within a tolerance, the additional similarity score; and
causing, based on the particular similarity score matching the additional similarity score within the tolerance, the first concept to sequentially follow from the additional first concept and the second concept.

9. The method of claim 1, wherein the first concept hierarchy includes a first table of contents part and the second concept hierarchy includes a second table of contents part,
the method further comprising:
identifying, based on identifying the first concept hierarchy and the second concept hierarchy, the one or more first concepts in the first table of contents part; and
identifying, based on identifying the one or more first concepts in the first table of contents part, the one or more second concepts in the second table of contents part.

10. The method of claim 1, further comprising:
determining recommended training data based on the new concept hierarchy.

11. The method of claim 1, further comprising:
receiving, based on generating the new concept hierarchy, historical training data;
determining a starting concept based on the historical training data;
receiving, based on determining the starting concept, a user training query;
determining intent data based on the user training query;
determining a goal concept based on the intent data; and
determining a recommended training data based on the starting concept, the goal concept, and the new concept hierarchy.

12. The device of claim 2, wherein the one or more processors, to perform the first process to merge the first concept with the second concept, are configured to:
determine one or more first keywords associated with the first concept; and cause the one or more first keywords to be added to one or more second keywords associated with the second concept.

13. The device of claim 2, wherein the one or more processors, to perform the second process to position the first concept sequentially before or after the second concept, are configured to:
    determine a first set of elements and a second set of elements of the first concept;
    determine a first set of elements and a second set of elements of the second concept;
    determine a first element similarity score based on the first set of elements of the first concept and the second set of elements of the second concept;
    determine a second element similarity score based on the second set of elements of the first concept and the first set of elements of the second concept; and
    cause the first concept to sequentially follow the second concept when the first element similarity score is greater than or equal to the second element similarity score, or the second concept to sequentially follow the first concept when the first element similarity score is less than the second element similarity score.

14. The device of claim 2, wherein the one or more processors, to perform the third process to position the first concept and the additional first concept to sequentially follow the second concept, are configured to:
    determine that a particular similarity score matches, within a tolerance, an additional similarity score,
        wherein the particular similarity score is associated with the first concept and the second concept,
        wherein the additional similarity score is associated with the first concept and the additional first concept; and
    cause, based on the particular similarity score matching the additional similarity score within the tolerance, the first concept and the additional first concept to sequentially follow the second concept.

15. The device of claim 2, wherein the one or more processors, to perform the fourth process to position the first concept to sequentially follow the additional first concept and the second concept, are configured to:
    determine that a particular similarity score matches, within a tolerance, an additional similarity score,
        wherein the particular similarity score is associated with the first concept and the second concept,
        wherein the additional similarity score is associated with the first concept and the additional first concept; and
    cause, based on the particular similarity score matching the additional similarity score within the tolerance, the first concept to sequentially follow the additional first concept and the second concept.

16. The device of claim 2, wherein the one or more processors, to determine the respective richness of content score for each multimedia presentation of the plurality of multimedia presentations, are configured to:
    determine, for each multimedia presentation of the plurality of multimedia presentations, one or more media items associated with the multimedia presentation;
    identify a reference media item;
    determine for each media item, of the one or more media items, a respective ratio of concepts covered by the reference media item that are also covered by a media item; and
    determine, based on the respective ratios of the one or more media items, the respective richness of content score of the multimedia presentation.

17. The non-transitory computer-readable medium of claim 3, wherein the one or more instructions, that cause the one or more processors to determine respective content information associated with each media item of the plurality of media items, cause the one or more processors to:
    determine, for a video item of the plurality of media items, a plurality of video fragments and a plurality of video fragment transcripts,
        wherein a particular video fragment, of the plurality of video fragments, is associated with a particular video fragment transcript, of the plurality of video fragment transcripts;
    generate, for the video item and based on the one or more video fragments, at least one video fragment nugget,
        wherein the at least one video fragment nugget includes one or more video fragments, of the plurality of video fragments, and one or more video fragment transcripts, of the plurality of video fragment transcripts, that are associated with the one or more video fragments; and
    determine one or more keywords associated with the at least one video fragment nugget.

18. The method of claim 5, further comprising:
    determining that the one or more first keywords are not associated with the second concept.

19. The method of claim 11, further comprising:
    determining that the recommended training data begins with the starting concept and takes a particular route, through the new concept hierarchy, to the goal concept.

20. The non-transitory computer-readable medium of claim 17, wherein the one or more instructions, that cause the one or more processors to generate the at least one video fragment nugget, cause the one or more processors to:
    determine a threshold distance based on a distance between each adjacent video fragment of the plurality of video fragments; and
    cause at least two adjacent video fragments, of the plurality of video fragments, and at least two respectively associated video fragment transcripts to be joined together to form a video fragment nugget,
        wherein a distance between the video fragment nugget and a particular adjacent video fragment, of the plurality of video fragments, satisfies the threshold distance.

* * * * *